United States Patent
Hayashi et al.

(10) Patent No.: US 9,468,082 B2
(45) Date of Patent: Oct. 11, 2016

(54) EXTREME ULTRAVIOLET LIGHT GENERATION APPARATUS AND CONTROL METHOD FOR LASER APPARATUS IN EXTREME ULTRAVIOLET LIGHT GENERATION SYSTEM

(71) Applicant: GIGAPHOTON INC., Tochigi (JP)

(72) Inventors: Hideyuki Hayashi, Oyama (JP); Kazuhiro Suzuki, Oyama (JP); Osamu Wakabayashi, Oyama (JP)

(73) Assignee: GIGAPHOTON INC., Tochigi (JP)

(*) Notice: Subject to any disclaimer, the term of this patent is extended or adjusted under 35 U.S.C. 154(b) by 0 days.

(21) Appl. No.: 14/814,983

(22) Filed: Jul. 31, 2015

(65) Prior Publication Data

US 2015/0342015 A1 Nov. 26, 2015

Related U.S. Application Data

(63) Continuation of application No. 14/290,483, filed on May 29, 2014, now Pat. No. 9,131,589.

(30) Foreign Application Priority Data

May 31, 2013 (JP) ................................. 2013-114964

(51) Int. Cl.
*H05G 2/00* (2006.01)
*H01S 3/10* (2006.01)
*H01S 3/00* (2006.01)
*H01S 3/23* (2006.01)

(52) U.S. Cl.
CPC ............... *H05G 2/008* (2013.01); *H01S 3/005* (2013.01); *H01S 3/10015* (2013.01); *H05G 2/006* (2013.01); *H01S 3/10038* (2013.01); *H01S 3/2316* (2013.01)

(58) Field of Classification Search
CPC ............... H01S 3/005; H01S 3/10015; H01S 3/10038; H01S 3/2316; H05G 2/006; H05G 2/008

See application file for complete search history.

(56) References Cited

U.S. PATENT DOCUMENTS

| 6,855,943 | B2 | 2/2005 | Shields | |
|---|---|---|---|---|
| 7,068,367 | B2 | 6/2006 | Stobrawa et al. | |
| 7,589,337 | B2 | 9/2009 | Bykanov et al. | |
| 8,158,960 | B2* | 4/2012 | Vaschenko | B82Y 10/00 250/504 R |
| 8,502,178 | B2* | 8/2013 | Moriya | H05G 2/008 250/504 R |
| 2012/0080584 | A1 | 4/2012 | Partlo et al. | |
| 2012/0228525 | A1* | 9/2012 | Moriya | H05G 2/003 250/504 R |
| 2012/0250710 | A1* | 10/2012 | Yoshino | H01S 3/0057 372/25 |
| 2012/0305811 | A1* | 12/2012 | Wakabayashi | H05G 2/008 250/504 R |
| 2012/0307851 | A1* | 12/2012 | Hori | H01S 3/2232 372/27 |
| 2013/0032735 | A1* | 2/2013 | Nowak | H01S 3/0085 250/504 R |
| 2014/0098830 | A1* | 4/2014 | Yabu | H05G 2/005 372/30 |
| 2015/0264793 | A1* | 9/2015 | Wakabayashi | H05G 2/008 250/504 R |

\* cited by examiner

*Primary Examiner* — Wyatt Stoffa
(74) *Attorney, Agent, or Firm* — Studebaker & Brackett PC

(57) ABSTRACT

An extreme ultraviolet light generation apparatus may include a chamber containing a plasma generation region irradiated by a pulse laser beam from a laser apparatus, a target supply device configured to supply a plurality of targets consecutively to the plasma generation region in the chamber, a target detection unit configured to detect a target outputted from the target supply device, and a laser controller configured to control the laser apparatus; the laser controller generating a light emission trigger instructing a laser device included in the laser apparatus to emit a pulse laser beam, and outputting the generated light emission trigger to the laser apparatus, in accordance with a detection signal from the target detection unit; and the laser controller adjusting generation of the light emission trigger outputted consecutively to the laser apparatus so that a time interval of the light emission trigger is within a predetermined range.

19 Claims, 14 Drawing Sheets

EXTREME ULTRAVIOLET LIGHT GENERATION APPARATUS AND CONTROL METHOD FOR LASER APPARATUS IN EXTREME ULTRAVIOLET LIGHT GENERATION SYSTEM

CROSS-REFERENCE TO A RELATED APPLICATION

The present application claims priority from Japanese Patent Application No. 2013-114964, filed May 31, 2013.

BACKGROUND

1. Technical Field

The present disclosure relates to apparatuses for generating extreme ultraviolet light and to control methods for laser apparatuses in extreme ultraviolet light generation systems.

2. Related Art

In recent years, semiconductor production processes have become capable of producing semiconductor devices with increasingly fine feature sizes, as photolithography has been making rapid progress toward finer fabrication. In the next generation of semiconductor production processes, microfabrication with feature sizes at 60 nm to 45 nm, and further, microfabrication with feature sizes of 32 nm or less will be required. In order to meet the demand for microfabrication with feature sizes of 32 nm or less, for example, an exposure apparatus is needed in which a system for generating EUV light at a wavelength of approximately 13 nm is combined with a reduced projection reflective optical system.

Three kinds of systems for generating EUV light are known in general, which include a Laser Produced Plasma (LPP) type system in which plasma is generated by irradiating a target material with a laser beam, a Discharge Produced Plasma (DPP) type system in which plasma is generated by electric discharge, and a Synchrotron Radiation (SR) type system in which orbital radiation is used to generate plasma.

SUMMARY

An extreme ultraviolet light generation apparatus according to one aspect of the present disclosure may be an extreme ultraviolet light generation apparatus that generates extreme ultraviolet light by irradiating a target with a pulse laser beam and producing plasma. The extreme ultraviolet light generation apparatus may include a chamber, a target supply device, a target detection unit, and a laser controller. The chamber may contain a plasma generation region irradiated by a pulse laser beam from a laser apparatus. The target supply device may be configured to supply a plurality of targets consecutively to the plasma generation region in the chamber. The target detection unit may be configured to detect a target outputted from the target supply device that has passed a predetermined position between the target supply device and the plasma generation region. The laser controller may be configured to control the laser apparatus. The laser controller may generate a light emission trigger instructing a laser device included in the laser apparatus to emit a pulse laser beam, and may output the generated light emission trigger to the laser apparatus, in accordance with a detection signal from the target detection unit indicating that a target has been detected. The laser controller may adjust generation of the light emission trigger outputted consecutively to the laser apparatus so that a time interval of the light emission trigger is within a predetermined range.

BRIEF DESCRIPTION OF THE DRAWINGS

Hereinafter, selected embodiments of the present disclosure will be described with reference to the accompanying drawings.

DETAILED DESCRIPTION

Figure 1:
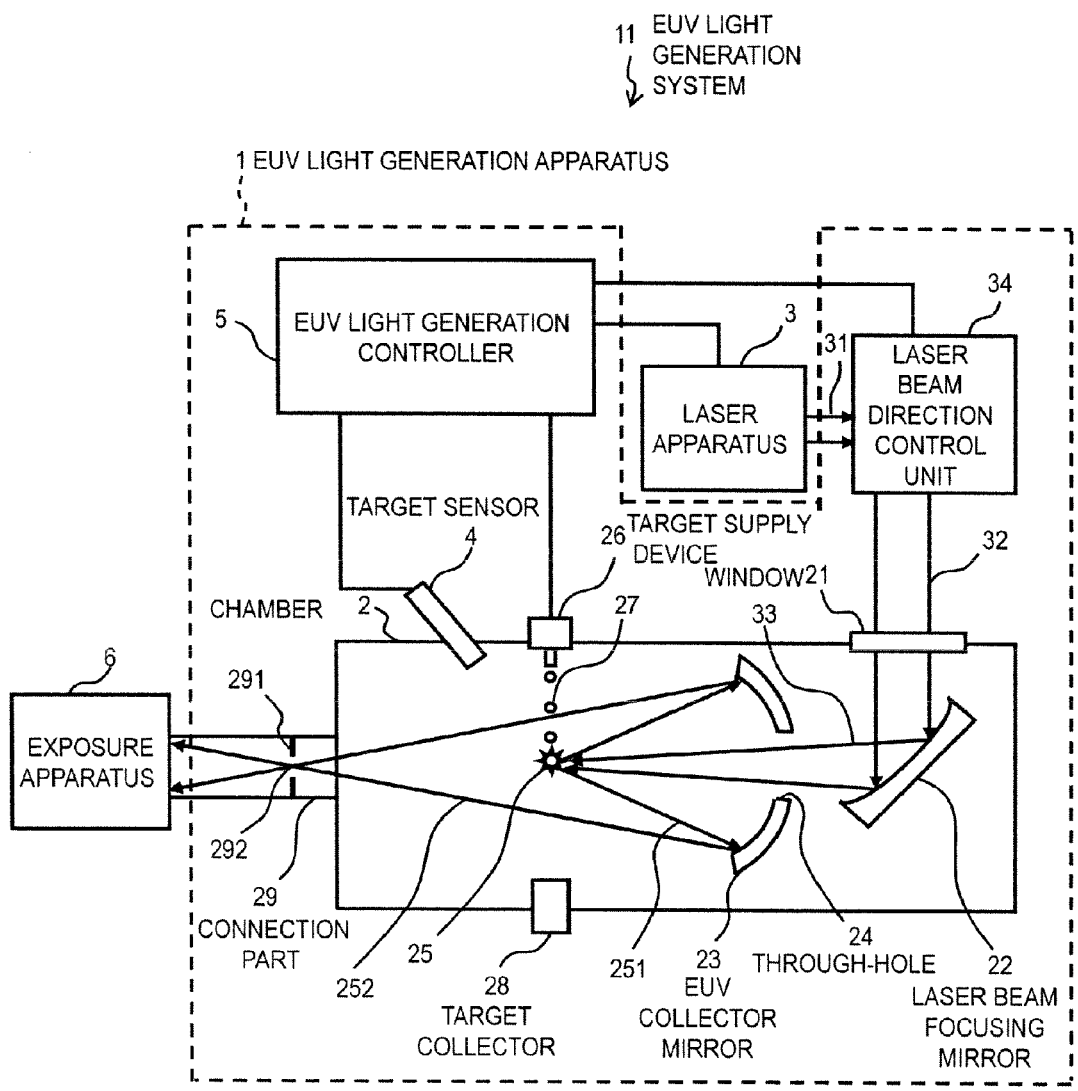
FIG. 1 schematically illustrates an exemplary configuration of an LPP type EUV light generation system.

Hereinafter, selected embodiments of the present disclosure will be described in detail with reference to the accompanying drawings. The embodiments to be described below are merely illustrative in nature and do not limit the scope of the present disclosure. Further, the configuration(s) and operation(s) described in each embodiment are not all essential in implementing the present disclosure. Note that like elements are referenced by like reference numerals and characters, and duplicate descriptions thereof will be omitted herein.

Contents
1. Overview
2. Terms
3. Overview of EUV Light Generation System
3.1 Configuration
3.2 Operation
4. Control of Target Supply Device and Laser Apparatus in EUV Light Generation Apparatus
4.1 Configuration of EUV Light Generation System
4.2 Operation
4.3 Issue
5. Control of Light Emission Triggers to Laser Device
5.1 First Embodiment
5.2 Second Embodiment
5.3 Third Embodiment (Laser Apparatus Including Optical Shutter)
5.4 Fourth Embodiment (Laser Apparatus Including Pre-pulse Laser Device)

1. Overview

In an LPP type EUV light generation system, a target supply device may output a target and cause the target to reach a plasma generation region within a chamber. By a laser device irradiating the target with a pulse laser beam at the point in time when the target reaches the plasma generation region, the target can be turned into plasma and EUV light can be radiated from the plasma.

In the EUV light generation system, it can be required that EUV light be generated over a predetermined time at a predetermined repetition rate. The predetermined repetition rate may be 100 kHz, for example. The target supply device may output the targets at the stated predetermined repetition rate in order for the EUV light generation system to generate the EUV light at the predetermined repetition rate.

The EUV light generation system may include a sensor for detecting the targets outputted from the target supply device between the target supply device and the plasma generation region. The sensor may measure the timing at which the targets pass. The EUV light generation system may output a pulse laser beam from the laser apparatus in synchronization with the timing at which the targets are detected by the sensor, and may irradiate the targets with the pulse laser beam.

By detecting the targets that pass through a predetermined position and outputting a light emission trigger to the laser apparatus in accordance with the timing at which the targets pass, the EUV light generation system can irradiate the targets with the pulse laser beam with a high level of precision at the point in time when the targets reach the plasma generation region.

However, the generation of the targets outputted from the target supply device can become unstable. Accordingly, a time interval over which the targets are outputted can become longer or shorter than a predetermined range. Meanwhile, satellites can be generated when the targets are generated by the target supply device. "Satellites" are small droplets that have separated from the original target, and can be mistakenly detected as targets by the sensor. Furthermore, in the case where the target material contains foreign objects, a flow rate of the target material can temporarily drop when such foreign objects traverse the interior of a nozzle.

As a result, a time interval over which the pulse laser beam is outputted can become longer or shorter. In the case with a time interval over which the pulse laser beam is outputted is shorter than a predetermined range, the energy of the pulse laser beam can drop and the pulse waveform can become distorted. This can lead to a problem in that the target will not be turned into plasma correctly. Furthermore, in the case where the time interval over which the pulse laser beam is outputted is shorter than the predetermined range, laser oscillation can become unstable and the laser apparatus can be damaged.

On the other hand, in the case where a time interval over which the pulse laser beam is outputted is longer than the predetermined range, the energy of the pulse laser beam can rise and the pulse waveform can become distorted. This can cause greater fluctuations to occur in the energy of the EUV light.

According to one aspect of the present disclosure, an EUV light generation apparatus may generate and output a light emission trigger that instructs a laser device included in a laser apparatus to emit a pulse laser beam in accordance with a detection signal from a target detection unit indicating that a target has been detected. The EUV light generation apparatus may adjust generation of the light emission trigger outputted consecutively to the laser apparatus so that a time interval of the light emission trigger is within a predetermined range.

2. Terms

Terms used in the present application will be described hereinafter. A "plasma generation region" can refer to a region where the generation of plasma for generating EUV light begins. It can be necessary for a target to be supplied to the plasma generation region and for a pulse laser beam to be focused at the plasma generation region at the timing at which the target reaches the plasma generation region in order for the generation of plasma to begin at the plasma generation region. A "light emission trigger" can be a signal instructing a laser device that generates and emits (outputs) a laser beam to emit the laser beam. A "light emission trigger signal" can be a signal that contains the light emission trigger and that changes over time.

3. Overview of EUV Light Generation System 3.1 Configuration

FIG. 1 schematically illustrates an exemplary configuration of an LPP type EUV light generation system. An EUV light generation apparatus 1 may be used with at least one laser apparatus 3. Hereinafter, a system that includes the EUV light generation apparatus 1 and the laser apparatus 3 may be referred to as an EUV light generation system 11. As shown in FIG. 1 and described in detail below, the EUV light generation system 11 may include a chamber 2 and a target supply device 26. The chamber 2 maybe sealed airtight. The target supply device 26 may be mounted onto the chamber 2, for example, to penetrate a wall of the chamber 2. A target material to be supplied by the target supply device 26 may include, but is not limited to, tin, terbium, gadolinium, lithium, xenon, or any combination thereof.

The chamber 2 may have at least one through-hole or opening formed in its wall, and a pulse laser beam 32 may travel through the through-hole/opening into the chamber 2. Alternatively, the chamber 2 may have a window 21, through which the pulse laser beam 32 may travel into the chamber 2. An EUV collector mirror 23 having a spheroidal surface may, for example, be provided in the chamber 2. The EUV collector mirror 23 may have a multi-layered reflective film formed on the spheroidal surface thereof. The reflective film may include a molybdenum layer and a silicon layer, which are alternately laminated. The EUV collector mirror 23 may have a first focus and a second focus, and may be positioned such that the first focus lies in a plasma generation region 25 and the second focus lies in an intermediate focus (IF) region 292 defined by the specifications of an external apparatus, such as an exposure apparatus 6. The EUV collector mirror 23 may have a through-hole 24 formed at the center thereof so that a pulse laser beam 33 may travel through the through-hole 24 toward the plasma generation region 25.

The EUV light generation system 11 may further include an EUV light generation controller 5 and a target sensor 4. The target sensor 4 may have an imaging function and detect at least one of the presence, trajectory, position, and speed of a target 27.

Further, the EUV light generation system 11 may include a connection part 29 for allowing the interior of the chamber 2 to be in communication with the interior of the exposure apparatus 6. A wall 291 having an aperture 293 may be provided in the connection part 29. The wall 291 may be positioned such that the second focus of the EUV collector mirror 23 lies in the aperture 293 formed in the wall 291.

The EUV light generation system 11 may also include a laser beam direction control unit 34, a laser beam focusing mirror 22, and a target collector 28 for collecting targets 27. The laser beam direction control unit 34 may include an optical element (not separately shown) for defining the direction into which the pulse laser beam 32 travels and an actuator (not separately shown) for adjusting the position and the orientation or posture of the optical element.

3.2 Operation

With continued reference to FIG. 1, a pulse laser beam 31 outputted from the laser apparatus 3 may pass through the laser beam direction control unit 34 and be outputted therefrom as the pulse laser beam 32 after having its direction optionally adjusted. The pulse laser beam 32 may travel through the window 21 and enter the chamber 2. The pulse laser beam 32 may travel inside the chamber 2 along at least one beam path from the laser apparatus 3, be reflected by the laser beam focusing mirror 22, and strike at least one target 27 as a pulse laser beam 33.

The target supply device 26 may be configured to output the target(s) 27 toward the plasma generation region 25 in the chamber 2. The target 27 may be irradiated with at least one pulse of the pulse laser beam 33. Upon being irradiated with the pulse laser beam 33, the target 27 may be turned into plasma, and rays of light 251 including EUV light may be emitted from the plasma. At least the EUV light included in the light 251 may be reflected selectively by the EUV collector mirror 23. EUV light 252, which is the light reflected by the EUV collector mirror 23, may travel through the intermediate focus region 292 and be outputted to the exposure apparatus 6. Here, the target 27 may be irradiated with multiple pulses included in the pulse laser beam 33.

The EUV light generation controller 5 may be configured to integrally control the EUV light generation system 11. The EUV light generation controller 5 may be configured to process image data of the target 27 captured by the target sensor 4. Further, the EUV light generation controller 5 may be configured to control at least one of: the timing when the target 27 is outputted and the direction into which the target 27 is outputted. Furthermore, the EUV light generation controller 5 may be configured to control at least one of: the timing when the laser apparatus 3 oscillates, the direction in which the pulse laser beam 33 travels, and the position at which the pulse laser beam 33 is focused. It will be appreciated that the various controls mentioned above are merely examples, and other controls may be added as necessary.

Figure 2:
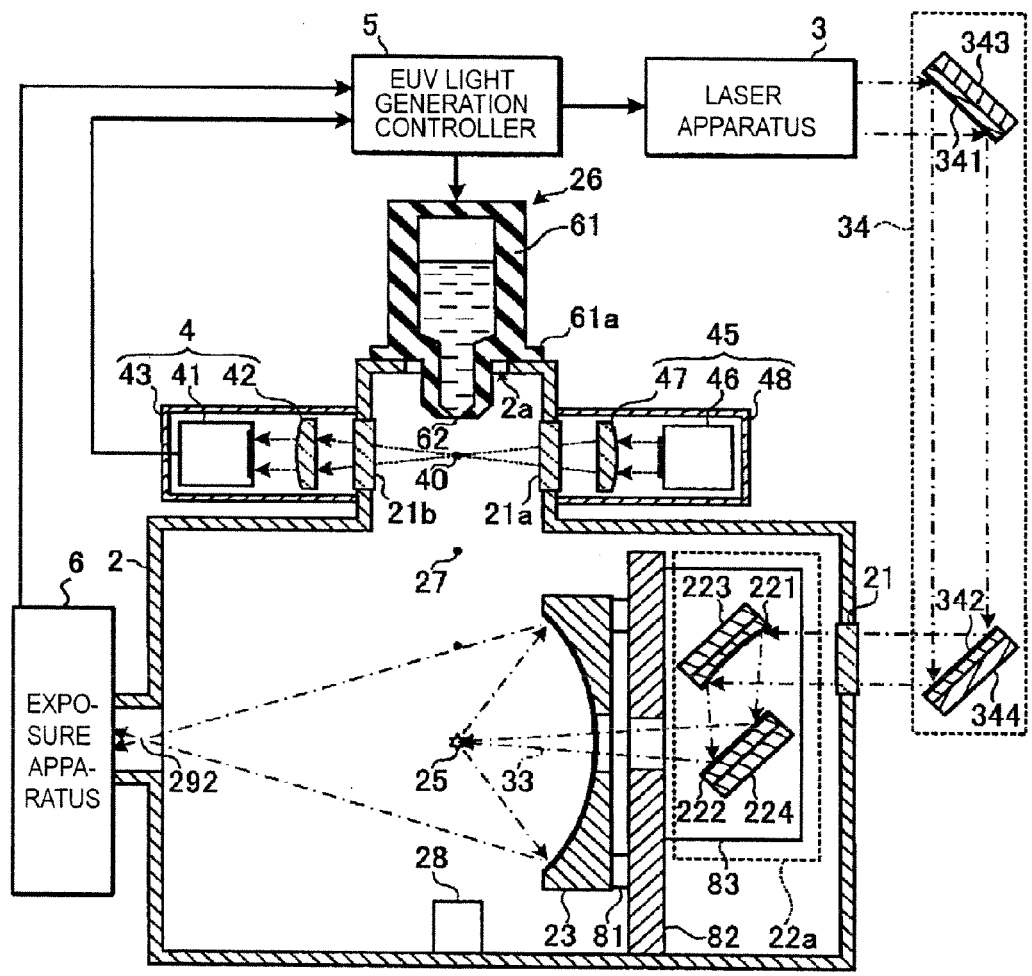
FIG. 2 is a partial cross-sectional view illustrating the configuration of an EUV light generation system.

4. Control of Target Supply Device and Laser Apparatus in EUV Light Generation System 4.1 Configuration of EUV Light Generation System FIG. 2 is a partial cross-sectional view illustrating the configuration of the EUV light generation system. As shown in FIG. 2, a laser beam focusing optical system 22a, the EUV collector mirror 23, the target collector 28, an EUV collector mirror holder 81, and plates 82 and 83 may be provided within the chamber 2.

The plate 82 may be anchored to the chamber 2. The plate 83 may be anchored to the plate 82. The EUV collector mirror 23 may be anchored to the plate 82 via the EUV collector mirror holder 81.

The laser beam focusing optical system 22a may include an off-axis paraboloid mirror 221, a flat mirror 222, and holders 223 and 224. The off-axis paraboloid mirror 221 and the flat mirror 222 may be held by the holders 223 and 224, respectively. The holders 223 and 224 may be anchored to the plate 83.

The positions and orientations of the off-axis paraboloid mirror 221 and the flat mirror 222 may be held so that the pulse laser beam 33 reflected by those mirrors is focused at the plasma generation region 25. The target collector 28 may be disposed upon a straight line extending from the trajectory of the target 27.

The target supply device 26 may be attached to the chamber 2. The target supply device 26 may include a reservoir 61. The reservoir 61 may hold a target material that has been melted using a heater 261 shown in FIG. 3. An opening serving as a nozzle opening 62 may be formed in the reservoir 61.

Part of the reservoir 61 may be inserted into a through-hole 2a formed in a wall surface of the chamber 2 so that the nozzle opening 62 formed in the reservoir 61 is positioned inside the chamber 2. The target supply device 26 may supply the melted target material to the plasma generation region 25 within the chamber 2 as droplet-shaped targets 27 via the nozzle opening 62. A flange portion 61a of the reservoir 61 may be tightly fitted and anchored to the wall surface of the chamber 2 in the periphery of the through-hole 2a.

The target sensor 4 and a light-emitting section 45 may be attached to the chamber 2. The target sensor 4 may include a photodetector 41, an image forming optical system 42, and a receptacle 43. The receptacle 43 may be anchored to the outside of the chamber 2, and the photodetector 41 and the image forming optical system 42 may be anchored within the receptacle 43. The light-emitting section 45 may include a light source 46, a focusing optical system 47, and a receptacle 48.

The receptacle 48 may be anchored to the outside of the chamber 2, and the light source 46 and the focusing optical system 47 may be anchored within the receptacle 48. Light outputted from the light source 46 can be focused by the focusing optical system 47. The focal position of the outputted light may be located substantially upon the trajectory of the targets 27.

The target sensor 4 and the light-emitting section 45 may be disposed opposite to each other on either side of the trajectory of the targets 27. Windows 21a and 21b may be provided in the chamber 2. The window 21a may be positioned between the light-emitting section 45 and the trajectory of the targets 27.

The light-emitting section 45 may focus light at a predetermined position in the trajectory of the targets 27 via the window 21a. The window 21b may be positioned between the trajectory of the targets 27 and the target sensor 4. When the target 27 passes through the focal position of the light emitted from the light-emitting section 45, the target sensor 4 may detect a change in the light passing through the trajectory of the target 27 and the vicinity thereof and may output a passage timing signal as a target 27 detection signal.

A single detection pulse may be outputted as the passage timing signal each time a single target 27 is detected. The image forming optical system 42 may form, upon a light-receiving surface of the target sensor 4, an image of the trajectory of the target 27 and the vicinity thereof, in order to improve the accuracy of the detection of the target 27.

A position of the center of the target 27 detected by the target sensor 4 will be referred to as a target detection position 40 in the following descriptions. In the example shown in FIG. 2, the target detection position 40 can substantially match the focal position of the light emitted from the light-emitting section 45.

The laser beam direction control unit 34 and the EUV light generation controller 5 may be provided outside the chamber 2. The laser beam direction control unit 34 may include high-reflecting mirrors 341 and 342, as well as holders 343 and 344. The high-reflecting mirrors 341 and 342 may be held by the holders 343 and 344, respectively. The high-reflecting mirrors 341 and 342 may conduct the pulse laser beam outputted by the laser apparatus 3 to the laser beam focusing optical system 22a via the window 21.

The EUV light generation controller 5 may receive an EUV light generation signal from the exposure apparatus 6. The EUV light generation signal may be a signal instructing the EUV light generation system 11 to generate EUV light during a predetermined time. The EUV light generation controller 5 may carry out control operations for outputting EUV light to the exposure apparatus 6 during the stated predetermined time.

4.2 Operation

Figure 3:
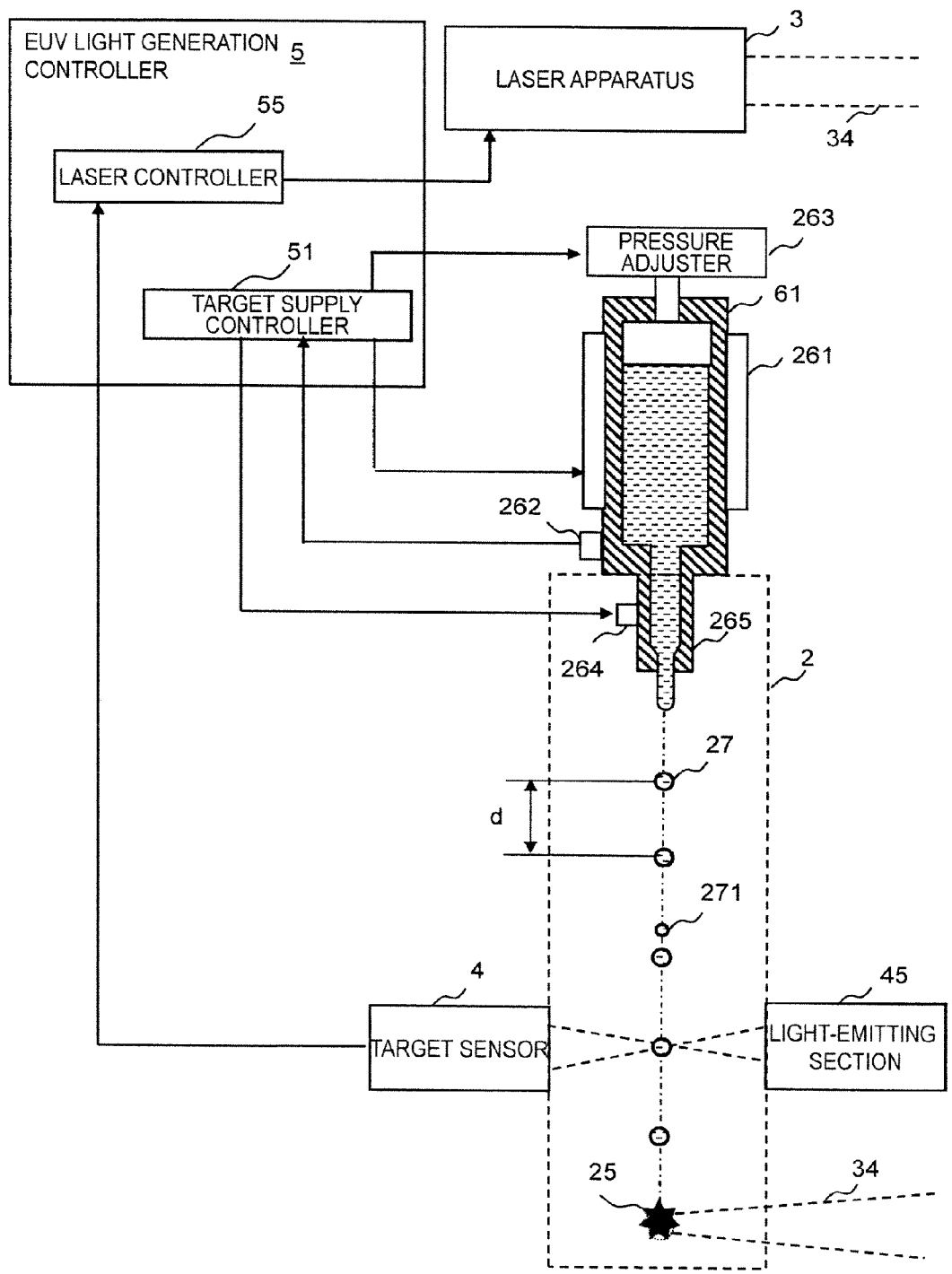
FIG. 3 is a block diagram illustrating control of a target supply device and a laser apparatus performed by an EUV light generation controller.

FIG. 3 is a block diagram illustrating control of the target supply device 26 and the laser apparatus 3 performed by the EUV light generation controller 5. The EUV light generation controller 5 may include a target supply controller 51 and a laser controller 55. The target supply controller 51 may control operations performed by the target supply device 26. The laser controller 55 may control operations performed by the laser apparatus 3.

In addition to the reservoir 61 that holds the target material in a melted state, the target supply device 26 may include the heater 261, a temperature sensor 262, a pressure adjuster 263, a piezoelectric element 264, and a nozzle 265. The heater 261 and the temperature sensor 262 may be anchored to the reservoir 61. The piezoelectric element 264 may be anchored to the nozzle 265. The nozzle 265 may have the nozzle opening 62, shown in FIG. 2, that outputs the target 27, which is liquid Sn, for example. The pressure adjuster 263 may be provided in a pipe located between an inert gas supply section and the reservoir 61.

The target supply controller 51 may control the heater 261 based on a value detected by the temperature sensor 262. For example, the target supply controller 51 may control the heater 261 so that the Sn within the reservoir 61 reaches a predetermined temperature greater than or equal to the melting point of the Sn. As a result, the reservoir 61 can melt the Sn held therewithin. The predetermined temperature may be a temperature of 232° C. to 300° C., for example.

The target supply controller 51 may control a pressure within the reservoir 61 using the pressure adjuster 263. The pressure adjuster 263 may adjust the pressure within the reservoir 61 under the control of the target supply controller 51 so that the targets 27 reach the plasma generation region 25 at a predetermined velocity.

The target supply controller 51 may send an electrical signal having a predetermined frequency to the piezoelectric element 264. The piezoelectric element 264 can vibrate in response to the received electrical signal, and can cause the nozzle 265 to vibrate at the stated frequency.

As a result, the droplet-shaped targets 27 can be generated from a jet of the liquid Sn outputted from the nozzle opening 62 as a result of the piezoelectric element 264 causing the nozzle opening 62 to vibrate. This method for generating targets is sometimes referred to as the "continuous jet method". In this manner, the target supply device 26 can supply the droplet-shaped targets 27 to the plasma generation region 25 at a predetermined velocity and a predetermined interval d. At this time, a predetermined time interval T can be calculated using the predetermined velocity and the predetermined interval d.

4.3 Issue

Satellites 271 may be produced when the target supply controller 51 generates the droplet-shaped target 27. The satellites 271 may be droplets, smaller than the target 27, that have separated from the original target 27. The satellites 271 may be located immediately before or immediately after the original target 27 moving toward the plasma generation region 25. The satellites 271 can be targets that are not desirable.

In addition to the original target 27, the target sensor 4 may detect the satellites 271 as targets as well, based on the light outputted by the light-emitting section 45. By detecting the satellites 271 in addition to the original target 27, the target sensor 4 may output a detection signal indicating that a target has been detected. The detection signal indicating that a target has been detected may be a detection pulse in a passage timing signal SA described below.

The target sensor 4 may output the detection signal indicating that a target has been detected to the laser controller 55. As described above, the satellites 271 can reduce the time interval of the detection signal. Furthermore, in the case where the target material contains foreign objects, a flow rate of the target material can temporarily drop when such foreign objects traverse the interior of the nozzle 265, which can increase the output time interval of the targets 27. Accordingly, the output time interval of the targets 27 from the target supply controller 51 can fluctuate, and the time interval of the detection signal can also fluctuate in response thereto.

Figure 4:
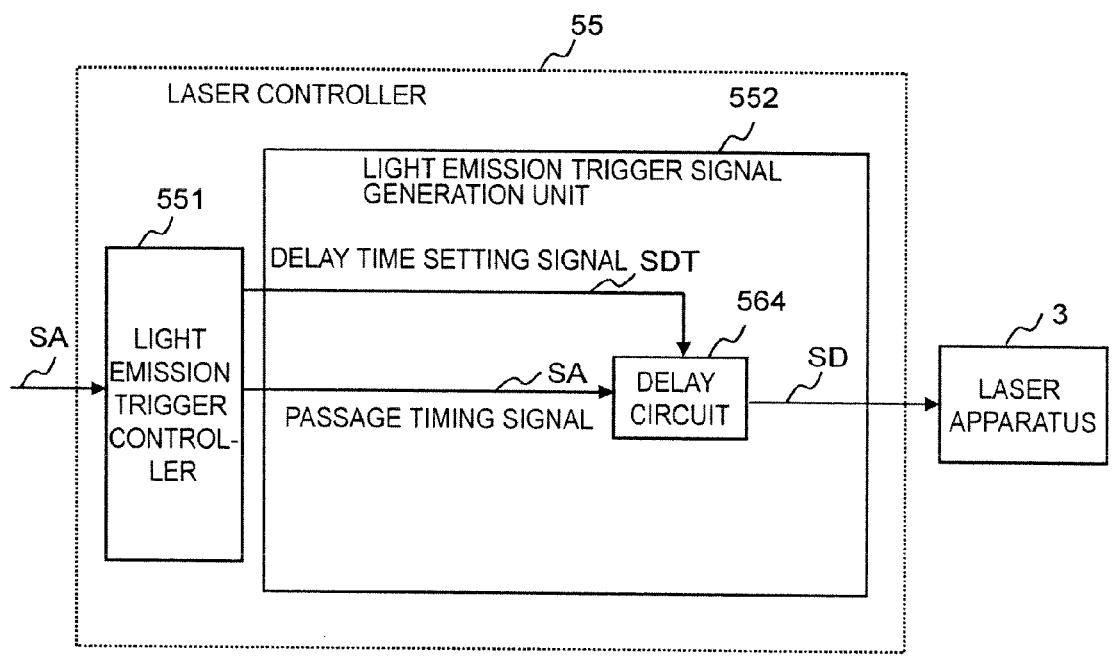
FIG. 4 schematically illustrates a comparative example of the configuration of a laser controller.

FIG. 4 schematically illustrates a comparative example of the configuration of the laser controller 55. The laser controller 55 may include a light emission trigger controller 551 and a light emission trigger signal generation unit 552. The light emission trigger signal generation unit 552 may generate a light emission trigger signal SD that is to be inputted to the laser apparatus 3, and may output the generated signal to the laser apparatus 3.

The light emission trigger signal generation unit 552 may include a delay circuit 564. An input of the delay circuit 564 may be connected to the light emission trigger controller 551, and an output of the delay circuit 564 may be connected to the laser apparatus 3. The light emission trigger controller 551 may set a delay time td of the delay circuit 564 in accordance with a delay time setting signal SDT. The light emission trigger controller 551 may receive the passage timing signal SA from the target sensor 4 and output the received signal to the light emission trigger signal generation unit 552.

The delay circuit 564 may receive the passage timing signal SA, generate the light emission trigger signal SD by delaying the passage timing signal SA by the delay time td, and output the light emission trigger signal SD to the laser apparatus 3. The light emission trigger signal SD may contain a light emission trigger that instructs a laser device included in the laser apparatus 3 to emit a pulse laser beam. The light emission trigger may be a light emission trigger pulse, which is a pulse signal.

Figure 5A:
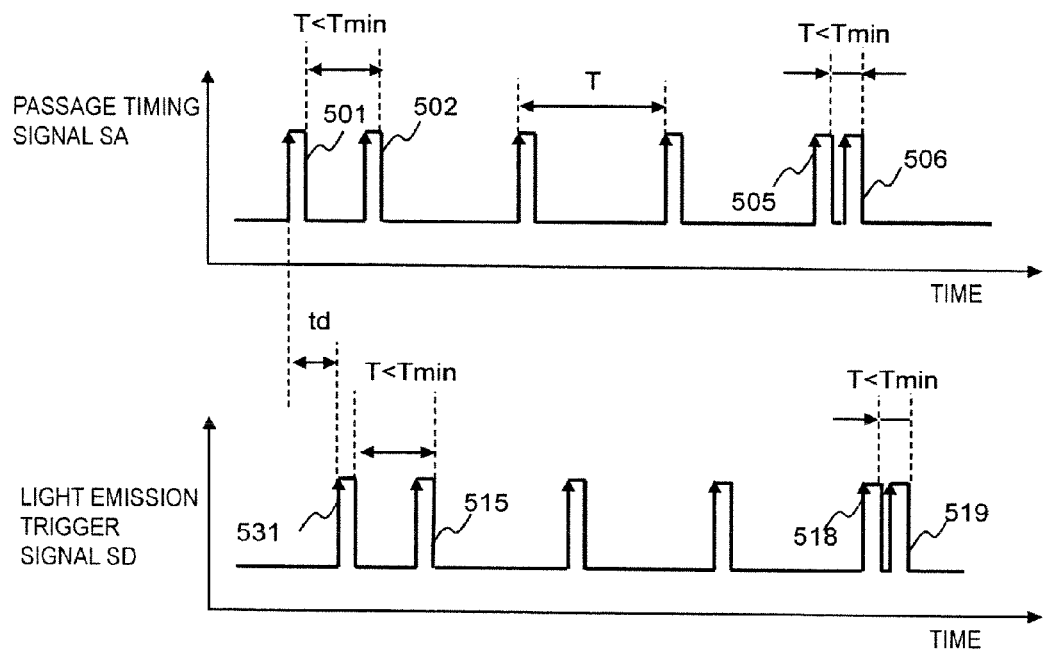
FIG. 5A illustrates an example of timing charts indicating signals from a light emission trigger signal generation unit indicated in FIG. 4.
Figure 5B:
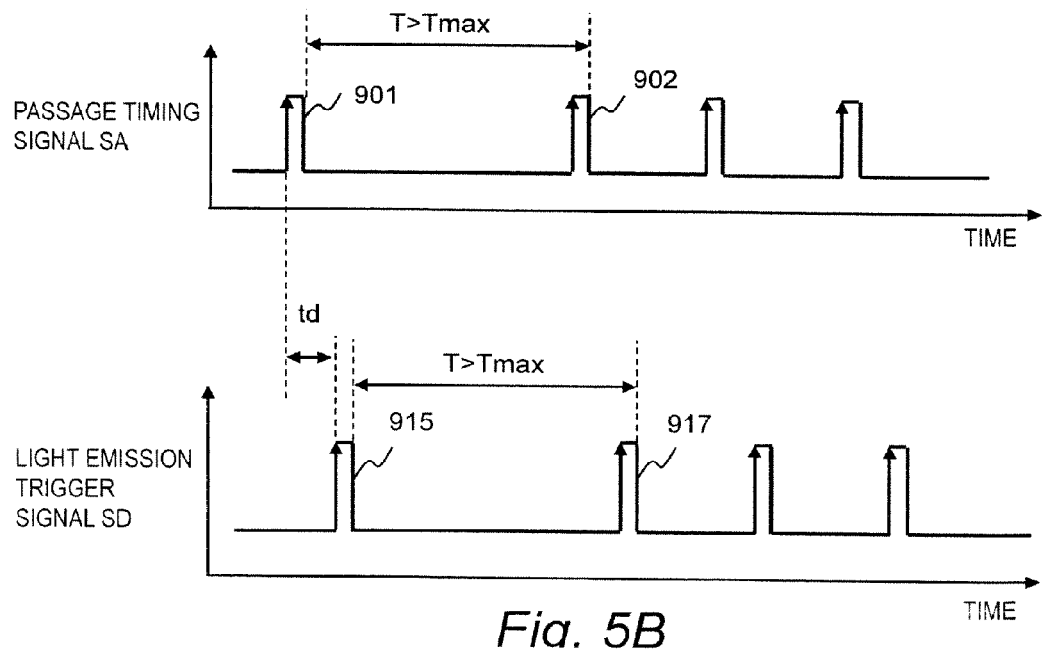
FIG. 5B illustrates an example of timing charts indicating signals from a light emission trigger signal generation unit indicated in FIG. 4.

FIGS. 5A and 5B are examples of timing charts indicating signals from the light emission trigger signal generation unit 552. Specifically, FIGS. 5A and 5B are examples of timing charts indicating the passage timing signal SA and the light emission trigger signal SD from the delay circuit 564, respectively. As shown in FIGS. 5A and 5B, each pulse in the light emission trigger signal SD can be delayed from the corresponding pulses in the passage timing signal SA by the delay time td.

In the case where the targets 27 are being supplied correctly, the time interval T of the detection pulses in the passage timing signal SA can be within a predetermined range. In other words, Tmin≤T≤Tmax can hold true. The light emission trigger pulses in the light emission trigger signal SD can also be generated at the same cycle. The predetermined range for the time interval T of the detection pulse will be referred to as a "permissible range" hereinafter.

However, as described above, the time interval T of the detection pulses in the passage timing signal SA can become shorter than Tmin or longer than Tmax due to target generation abnormalities occurring as a result of satellites being produced, the presence of foreign objects, and so on.

For example, in FIG. 5A, the time interval T between a pulse 501 and a pulse 502 in the passage timing signal can be less than Tmin. Likewise, the time interval T between a pulse 505 and a pulse 506 can be less than Tmin. Due to the time interval of the pulses in the passage timing signal SA, the time interval T between a pulse 531 and a pulse 515 in the light emission trigger signal SD can be less than Tmin. Furthermore, the time interval T between a pulse 518 and a pulse 519 can be less than Tmin.

In FIG. 5B, the time interval T between a detection pulse 901 and a detection pulse 902 can be greater than Tmax. Due to the time interval of the pulses in the passage timing signal SA, the time interval T between a light emission trigger pulse 915 and a light emission trigger pulse 917 can be greater than Tmax.

As described above, in the case where the time interval of the light emission trigger supplied to the laser apparatus 3 is outside the permissible range (Tmin≤T≤Tmax), the energy and waveform of the pulse laser beam outputted from the laser apparatus 3 to the plasma generation region 25 may change, and the energy of the EUV light may change greatly as a result. The light emission trigger signal generation unit 552 according to the present disclosure can generate the light emission trigger signal SD so that the output interval of the light emission trigger is within the permissible range, as will be described hereinafter.

Figure 6:
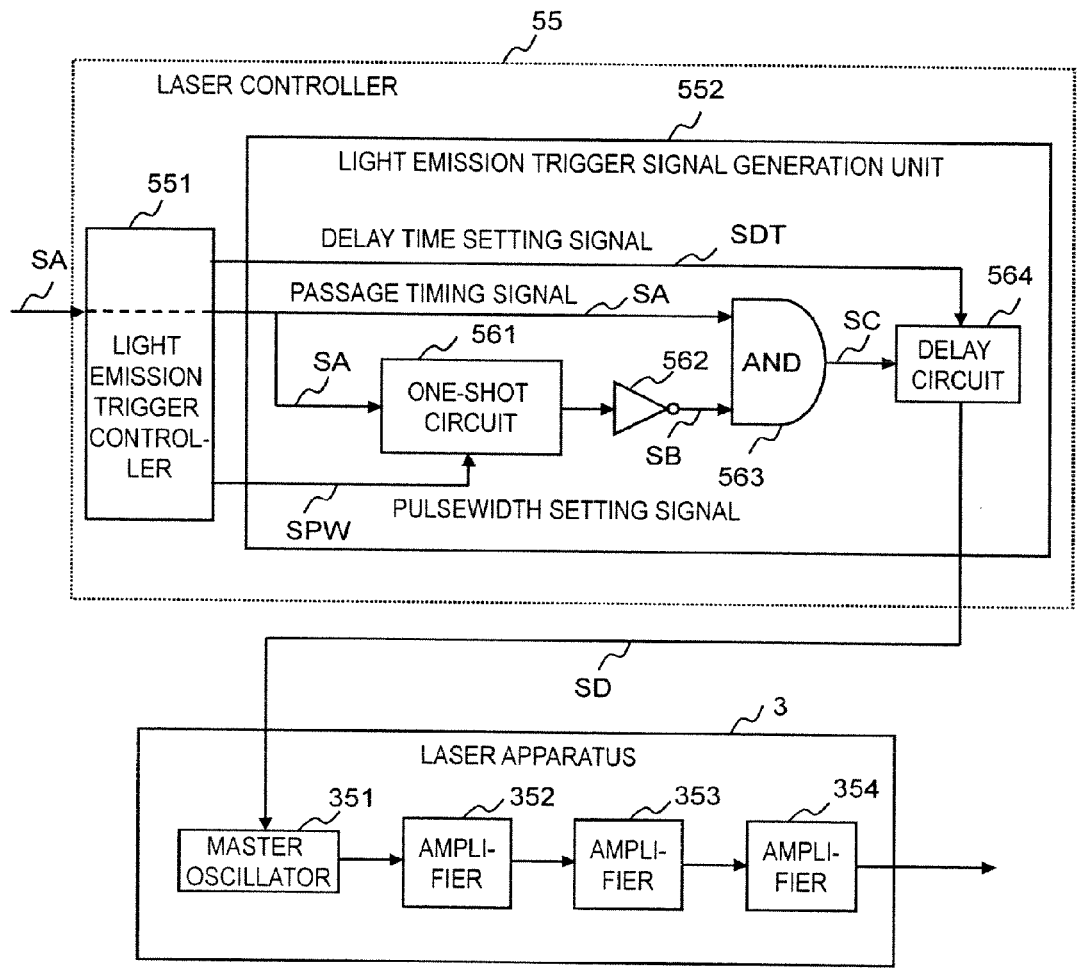
FIG. 6 schematically illustrates an example of the configuration of a laser controller and a laser apparatus according to a first embodiment.

5. Control of Light Emission Triggers to Laser Device
5.1 First Embodiment
Configuration FIG. 6 schematically illustrates an example of the configuration of the laser controller 55 and the laser apparatus 3 according to the first embodiment. The laser controller 55 according to the present embodiment may, in the case where the time interval of sequential first and second detection pulses in the passage timing signal SA is less than a predetermined time, forego outputting a light emission trigger pulse corresponding to the second detection pulse. Through this, fluctuations in the pulse laser beam caused by a master oscillator 351 in the laser apparatus 3 having a short light emission interval can be suppressed.

The laser controller 55 may include the light emission trigger controller 551 and the light emission trigger signal generation unit 552. The light emission trigger signal generation unit 552 may include a one-shot circuit 561, an inverter 562, an AND circuit 563, and the delay circuit 564. The light emission trigger signal generation unit 552 may generate the light emission trigger signal SD and output the generated signal to the laser apparatus 3.

The light emission trigger controller 551 may control the generation of the light emission trigger signal SD. The light emission trigger controller 551 may set a pulsewidth Tsh of the one-shot circuit 561 via a pulsewidth setting signal SPW. The light emission trigger controller 551 may set the delay time td of the delay circuit 564 in accordance with the delay time setting signal SDT. The light emission trigger controller 551 may receive the passage timing signal SA from the target sensor 4. Alternatively, the light emission trigger signal generation unit 552 may receive the passage timing signal SA without using the light emission trigger controller 551.

An input of the one-shot circuit 561 may be connected to an output of the light emission trigger controller 551. The one-shot circuit 561 may receive the passage timing signal SA from the light emission trigger controller 551. The one-shot circuit 561 may output a pulse signal having the pulsewidth Tsh in response to a falling edge of the input signal. An input of the inverter 562 may be connected to an output of the one-shot circuit 561.

One input of the AND circuit 563 may be connected to an output of the inverter 562. Another input of the AND circuit 563 may be connected to an output of the light emission trigger controller 551. The AND circuit 563 may receive the passage timing signal SA from the light emission trigger controller 551. An input of the delay circuit 564 may be connected to an output of the AND circuit 563. The delay circuit 564 may output the light emission trigger signal SD to the laser apparatus 3. Details of the signals SA to SD in the light emission trigger signal generation unit 552 will be given later.

The laser apparatus 3 may include the master oscillator 351 as well as a first amplifier 352, a second amplifier 353, and a third amplifier 354. The master oscillator 351 can be a laser device that generates and outputs a pulse laser beam. The master oscillator 351, the first amplifier 352, the second amplifier 353, and the third amplifier 354 may be connected in series. The master oscillator 351 may be a $CO_2$ laser including a Q switch. The amplifiers 352 to 354 may be amplifiers that contain $CO_2$ laser gas. The number of amplifiers can depend on the design. The amplifiers 352 to 354 may be omitted.

Operation

Referring to FIG. 6, the light emission trigger controller 551 may receive the passage timing signal SA from the target sensor 4, and may output the received signal to the one-shot circuit 561 and the AND circuit 563. For example, the one-shot circuit 561 may output a pulse having the pulsewidth Tsh at the falling edge of the passage timing signal SA. In other words, the one-shot circuit 561 may detect a timing at which the passage timing signal SA changes from ON, which is a high-level, to OFF, which is a low-level, and may generate a pulse indicating the timing of that detection.

The inverter 562 may receive the signal outputted from the one-shot circuit 561, and may generate an output signal SB by inverting the received signal. The output signal SB from the inverter 562 may be inputted to the AND circuit 563.

The AND circuit 563 may receive the passage timing signal SA from the light emission trigger controller 551 and the output signal SB from the inverter 562. The AND circuit 563 may generate an AND signal SC from the received passage timing signal SA and the inverter output signal SB. The AND signal SC outputted from the AND circuit 563 can be ON when both the input signals SA and SB are ON, and can be OFF when at least one of the input signals is OFF.

The AND circuit 563 may output the AND signal SC to the delay circuit 564. The delay circuit 564 may generate the light emission trigger signal SD based on the AND signal SC and may output the generated signal to the master oscillator 351. The delay circuit 564 may output the light emission trigger signal SD, which has been generated by delaying the received AND signal SC by the delay time td.

The light emission trigger signal SD may be a signal in which the prescribed delay time td has been applied to the AND signal SC. The delay time td can be a delay time that causes the pulse laser beam to be focused at the plasma generation region 25 at the timing at which the target 27 detected by the target sensor 4 reaches the plasma generation region 25.

The delay time td can be applied using the following formula, for example.

$$td = L/v - \alpha$$

L may represent a distance from the target detection position 40 to a center position of the plasma generation region 25. v may represent a velocity of the target 27. α may represent an amount of time from when the light emission trigger instructing the laser apparatus 3 to emit the pulse laser beam is outputted to when the pulse laser beam is focused at the plasma generation region 25.

The master oscillator 351 of the laser apparatus 3 may receive the light emission trigger signal SD from the delay circuit 564 of the laser controller 55. The master oscillator 351 may output the pulse laser beam in accordance with the light emission trigger signal SD. The master oscillator 351 may output the pulse laser beam in response to, for example, the falling edge of the pulse in the light emission trigger signal SD. The pulse of the light emission trigger signal can serve as the light emission trigger instructing the master oscillator 351 to emit (output) the pulse laser beam.

The pulse laser beam outputted from the master oscillator 351 may be amplified by the first amplifier 352. The pulse laser beam amplified by and outputted from the first amplifier 352 may be further amplified by the second amplifier 353, and the pulse laser beam amplified by and outputted from the second amplifier 353 may be further amplified by the third amplifier 354.

Figure 7:
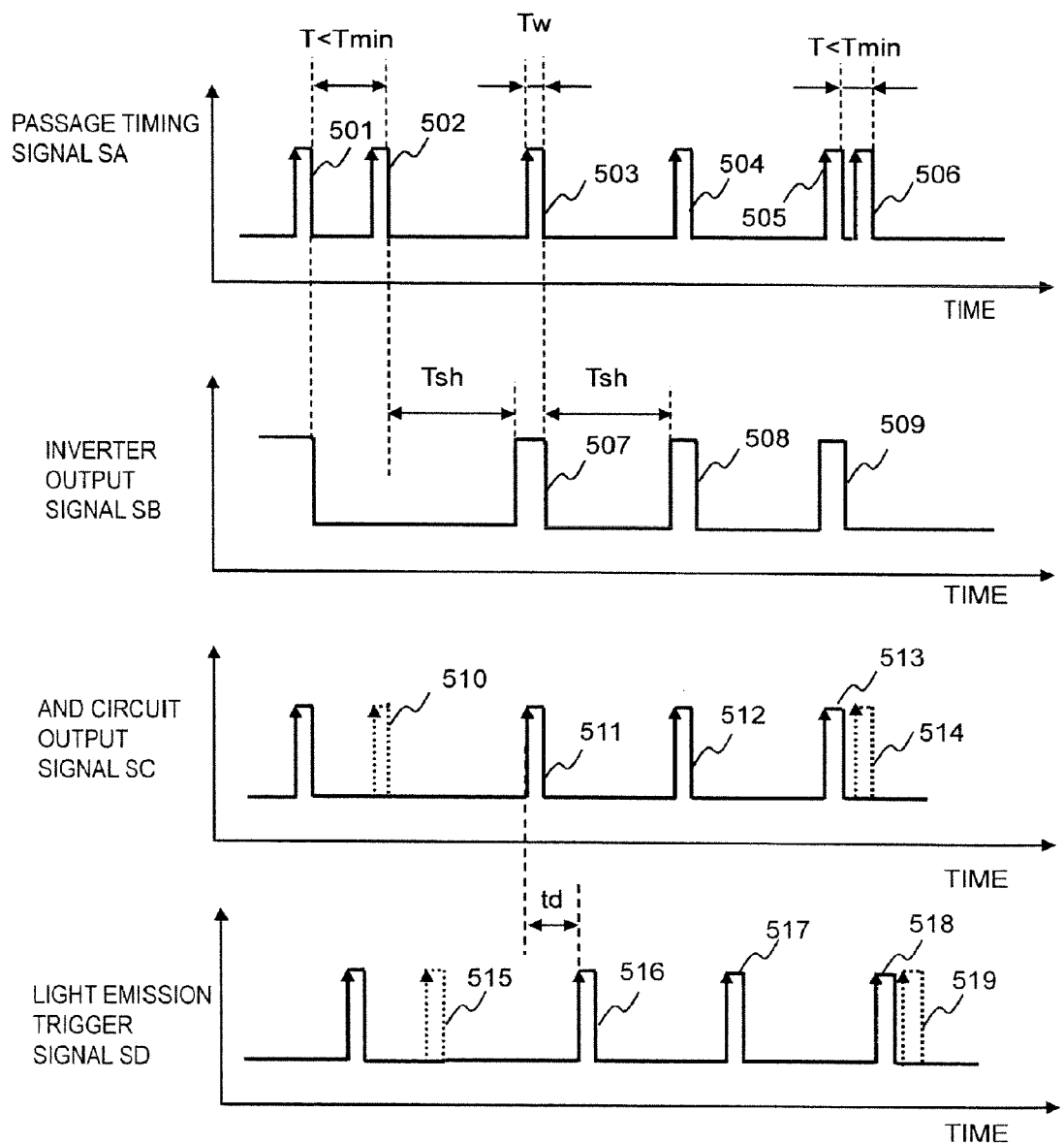
FIG. 7 illustrates an example of timing charts indicating signals from a light emission trigger signal generation unit indicated in FIG. 6, according to the first embodiment.

FIG. 7 is an example of timing charts indicating signals in the light emission trigger signal generation unit 552. This timing chart example indicates relationships among the signals in the light emission trigger signal generation unit 552. Specifically, FIG. 7 illustrates timing charts for the passage timing signal SA, the output signal SB from the inverter 562, the output signal SC from the AND circuit 563, and the light emission trigger signal SD from the delay circuit 564.

Detection pulses 501 to 506 in the passage timing signal SA can serve as detection signals indicating that a target has been detected. The detection pulses 501 and 503 to 505 can be pulses generated due to a desired target 27 being detected. On the other hand, the detection pulses 502 and 506 can be pulses generated due to targets that are different from the desired target 27 being detected. For example, the detection pulse 502 can be a pulse generated due to a target whose output is too early being detected, and the detection pulse 506 can be a pulse generated due to a satellite being detected.

As described above, in the case where the targets 27 are being supplied correctly, the time interval T of the detection pulses in the passage timing signal SA can be within the permissible range. In other words, Tmin≤T≤Tmax can hold true. The light emission trigger pulses in the light emission trigger signal SD can also be generated at the same cycle.

Tmin can be a minimum permissible value for the time interval of the light emission trigger. Tmax can be a maximum permissible value for the time interval of the light emission trigger.

On the other hand, as described above, the time interval T of the detection pulses in the passage timing signal SA can become shorter than Tmin or longer than Tmax due to target generation abnormalities. In FIG. 7, the time interval T between the detection pulse 501 and the detection pulse 502 can be less than Tmin. Likewise, the time interval T between the detection pulse 505 and the detection pulse 506 can be less than Tmin. As will be described later, the light emission trigger signal generation unit 552 can generate the light emission trigger signal SD so that the output interval of the light emission trigger does not become less than Tmin.

The detection pulse 501 in the passage timing signal SA can have a pulsewidth of Tw. Tw is a pulsewidth of a pulse generated when targets 27 that have been correctly generated are detected. The output signal of the one-shot circuit 561 may change from OFF to ON at the falling edge of the detection pulse 501. The inverter output signal SB may be a signal obtained by inverting the output signal from the one-shot circuit 561. The inverter output signal SB may change from ON to OFF at the falling edge of the detection pulse 501.

The falling edge of the detection pulse 502 in the passage timing signal SA can be present while the inverter output signal SB is OFF. Upon detecting the falling edge of the input signal, the one-shot circuit 561 may reset a counter value for the pulsewidth Tsh. In other words, the pulsewidth Tsh of the output signal from the one-shot circuit 561 can be equivalent to an amount of time from the falling edge of the input signal SA immediately before.

A relationship of Tsh=Tmin−Tw, for example, may hold true for Tsh, Tmin, and Tw. The pulsewidth Tsh may be a value set in advance by a designer. The designer may determine Tmin and Tw in accordance with the system configuration, and may then determine Tsh based on those values.

The output signal from the one-shot circuit 561 may change from ON to OFF when a time equivalent to Tsh has passed from the falling edge of the detection pulse 502. In other words, the inverter output signal SB may change from OFF to ON when a time equivalent to Tsh has passed from the falling edge of the detection pulse 502. An amount of time from the falling edge of the detection pulse 502 to a rising edge of a pulse 507 in the inverter output signal SB may be equivalent to Tsh.

The AND circuit output signal SC can be ON when both the inverter output signal SB and the passage timing signal SA are ON. Accordingly, a pulse 510 corresponding to the detection pulse 502 need not be generated. Likewise, the light emission trigger pulse 515 of the light emission trigger signal corresponding to the pulse 510 in the AND circuit output signal SC need not be generated.

The detection pulse 503 in the passage timing signal SA can be outputted while the inverter output signal SB is ON.

Accordingly, a pulse 511 of the AND circuit output signal SC can be generated from the detection pulse 503.

A light emission trigger pulse 516 of the light emission trigger signal SD can be generated from the pulse 511 in the AND circuit output signal SC. The light emission trigger pulse 516 can be delayed from the pulse 511 in the AND circuit output signal SC by the delay circuit 564, by the delay time td.

The inverter output signal SB may change from OFF to ON when a time equivalent to Tsh has passed from the falling edge of the pulse 507. An amount of time from the falling edge of the pulse 507 to the rising edge of a pulse 508 in the inverter output signal SB may be equivalent to Tsh. The inverter output signal SB may change from ON to OFF and form the falling edge of the pulse 508 at the falling edge of the pulse 504 in the passage timing signal SA.

The pulse 504 in the passage timing signal SA can be outputted during the time when the inverter output signal SB is ON. Accordingly, a pulse 512 of the AND circuit output signal SC can be generated from the pulse 504.

A light emission trigger pulse 517 of the light emission trigger signal SD can be generated from the pulse 512 in the AND circuit output signal SC. The light emission trigger pulse 517 can be delayed from the pulse 512 in the AND circuit output signal SC by the delay circuit 564, by the delay time td.

A relationship among the pulses 505, 509, 513, and 518 can be the same as a relationship among the pulses 504, 508, 512, and 517. A relationship among the pulse 506, a pulse 514 that is not present, and a pulse 519 that is not present can be the same as a relationship among the pulse 502, a pulse 510 that is not present, and a pulse 515 that is not present.

Effect

According to the aforementioned configuration, the light emission trigger pulse can be suppressed from being outputted in the case where the time interval T of the detection pulses of the targets (droplets) is less than a minimum permissible value Tmin. As a result, a drop in the pulse energy and a change in the pulsewidth of the pulse laser beam outputted from the laser apparatus 3 can be suppressed. This in turn makes it possible to suppress fluctuations in the pulse energy of the EUV light and suppress the laser apparatus 3 from being damaged.

Other Configuration Example

Figure 8:
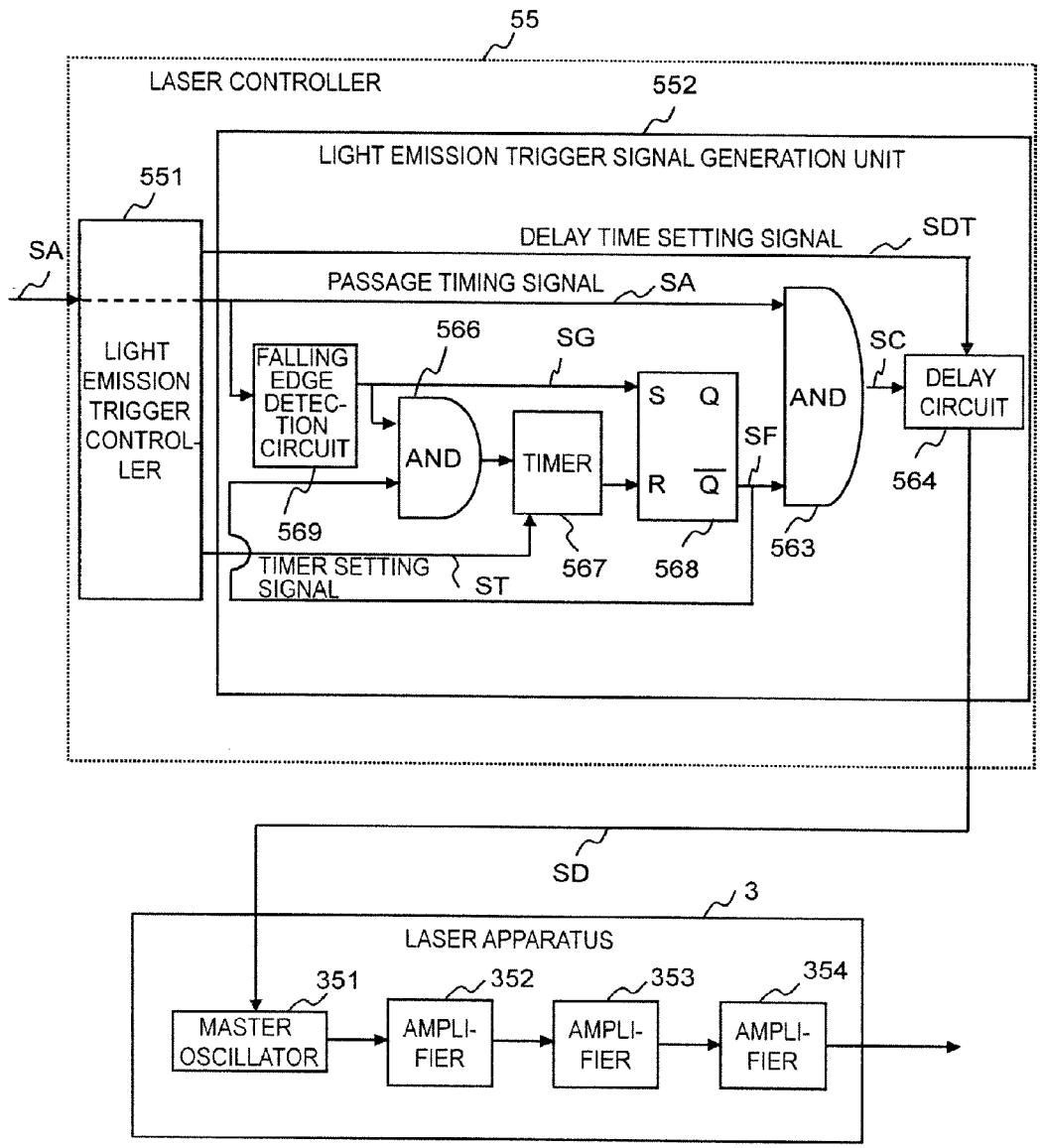
FIG. 8 schematically illustrates another example of the configuration of a laser controller and a laser apparatus according to the first embodiment.
Figure 9:
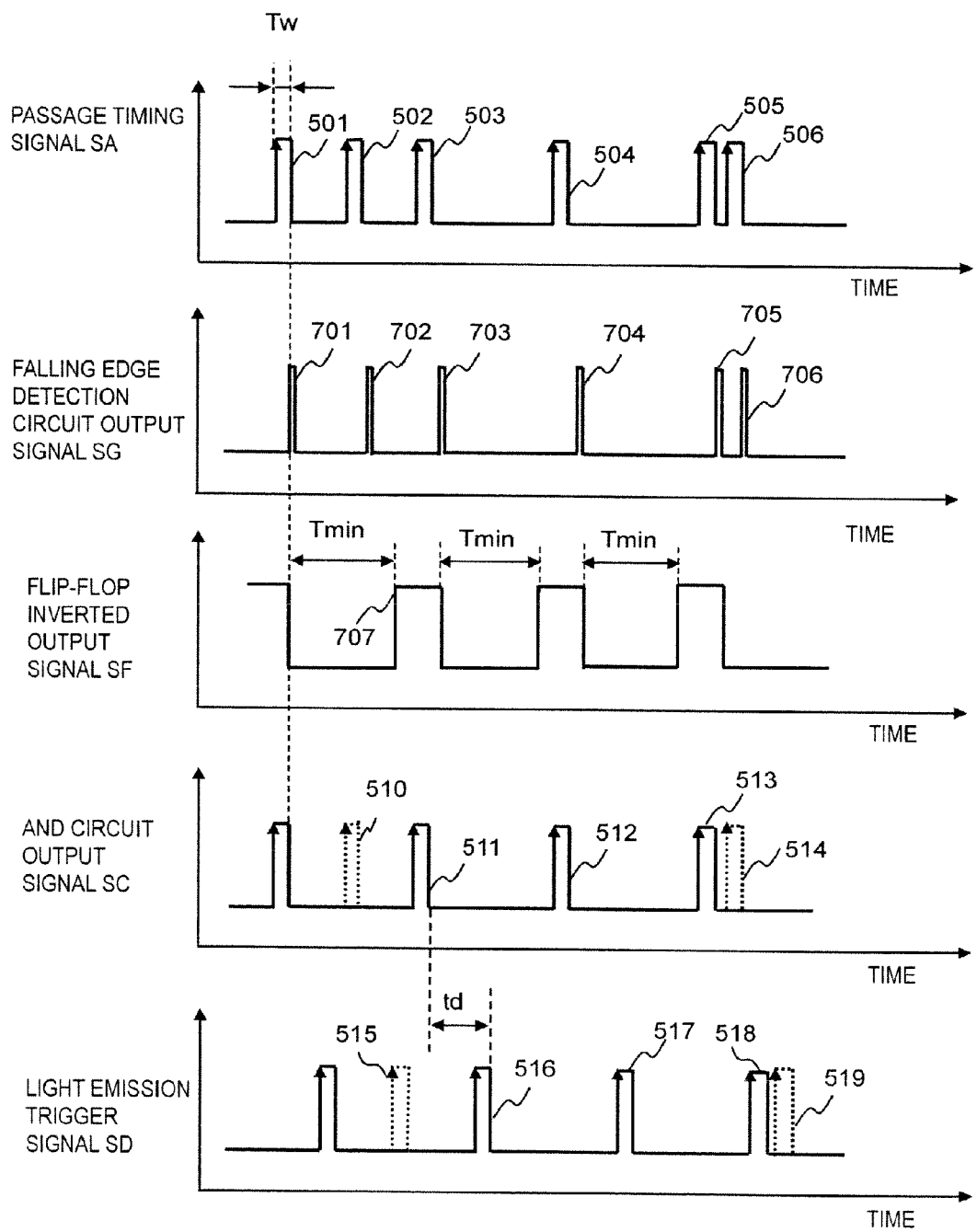
FIG. 9 illustrates an example of timing charts indicating signals from a light emission trigger signal generation unit indicated in FIG. 8, according to the first embodiment.

FIGS. 8 and 9 illustrate an example of another configuration according to the first embodiment. The following descriptions will focus primarily on points that are different from the configuration example described with reference to FIGS. 6 and 7. FIG. 8 schematically illustrates another example of the configuration of the laser controller 55 and the laser apparatus 3. FIG. 9 is an example of timing charts indicating signals in the light emission trigger signal generation unit 552 according to the configuration example shown in FIG. 8.

Configuration

As shown in FIG. 8, the light emission trigger signal generation unit 552 may include an AND circuit 566, a timer 567, an RS flip-flop 568, and a falling edge detection circuit 569 instead of the one-shot circuit 561 and the inverter 562 indicated in the configuration example shown in FIG. 6. The light emission trigger controller 551 may set a set time in the timer 567 using a timer setting signal ST. The set time may be Tmin.

An input of the falling edge detection circuit 569 may be connected to an output of the light emission trigger controller 551. The falling edge detection circuit 569 may receive the passage timing signal SA from the light emission trigger controller 551. The falling edge detection circuit 569 may output a pulse having a comparatively short pulsewidth in response to the falling edge of the input signal.

One input of the AND circuit 566 may be connected to an output of the falling edge detection circuit 569. Another input of the AND circuit 566 may be connected to an inverted Q terminal serving as an inverted output of the RS flip-flop 568. An input of the timer 567 may be connected to an output of the AND circuit 566.

The timer 567 may start measuring time upon detecting the rising edge of the input signal as a trigger for starting time measurement. The timer 567 may output a pulse when the set time has passed after the rising edge of the input signal. The set time may be Tmin. Upon detecting the rising edge of the input signal while measuring the time, the timer 567 may reset the time measurement value and begin measuring the time again.

An S terminal serving as a set input of the RS flip-flop 568 may be connected to the output of the falling edge detection circuit 569. An R terminal serving as a reset input of the RS flip-flop 568 may be connected to an output of the timer 567. The inverted output of the RS flip-flop 568 may be connected to one of the inputs of the AND circuit 563. An inverted output signal SF from the RS flip-flop 568 may be inputted to the AND circuit 563 and the AND circuit 566.

Operation

When a target is detected, the light emission trigger controller 551 may receive the passage timing signal SA and output a detection pulse. The RS flip-flop 568 may output an ON signal, corresponding to the detection pulse, to the AND circuit 563. The AND circuit 563 may generate a pulse based on the ON signal from the RS flip-flop 568 and the pulse in the passage timing signal SA, and may output the generated pulse to the delay circuit 564.

The timer 567 may start measuring time in response to the detection pulse in the passage timing signal SA. While the timer 567 is measuring time, the RS flip-flop 568 may hold the OFF signal at the inverted output regardless of whether the input signal at the set input is ON or OFF. Accordingly, while the timer 567 is measuring time, the AND circuit 563 and the delay circuit 564 may not generate the light emission trigger pulse even if a target is detected and the detection pulse in the passage timing signal SA is inputted.

When the measured time reaches the set time, the timer 567 may output a pulse. In response to a reset input signal changing from OFF to ON, the RS flip-flop 568 may change the inverted output signal inputted to the AND circuit 563 from OFF to ON. Thereafter, the AND circuit 563 and the delay circuit 564 may generate and output the light emission trigger pulse when the detection pulse in the passage timing signal SA is inputted. Furthermore, the timer 567 may start measuring time.

An example of operations performed by the light emission trigger signal generation unit 552 according to this example will be described with reference to the block diagram in FIG. 8 and the timing chart in FIG. 9. As shown in FIG. 8, the light emission trigger controller 551 may receive the passage timing signal SA and output the detection pulse 501 to the falling edge detection circuit 569 and the AND circuit 563. The inverted output signal SF from the RS flip-flop 568 prior to a change may be ON at the falling edge of the detection pulse 501.

The AND circuit 566 may receive the inverted output signal SF from the RS flip-flop 568 and the output signal from the falling edge detection circuit 569. The inverted output signal SF from the RS flip-flop 568 prior to a change may be ON at the falling edge of the detection pulse 501.

The falling edge detection circuit 569 may detect the falling edge of the detection pulse 501 and output a pulse 701. In other words, the output signal from the falling edge detection circuit 569 can change from OFF to ON. Accordingly, the AND circuit 566 can change its output signal from OFF to ON.

The timer 567 may start measuring time upon detecting a rising edge of the output signal from the AND circuit 566. The output signal from the timer 567 may be OFF while the timer 567 is measuring time. In other words, the reset input signal of the RS flip-flop 568 may be OFF at the falling edge of the pulse 501.

A set input signal of the RS flip-flop 568 maybe an output signal SG from the falling edge detection circuit 569. Accordingly, the set input signal SG of the RS flip-flop 568 can change from OFF to ON at the falling edge of the detection pulse 501. As a result, the inverted output signal SF of the RS flip-flop 568 can change from ON to OFF.

The detection pulse 502 may be inputted before the time Tmin has passed from the pulse 501. The falling edge detection circuit 569 may detect the falling edge of the detection pulse 502 and output a pulse 702. The set input signal of the RS flip-flop 568 can change from OFF to ON.

The reset input signal of the RS flip-flop 568 is OFF, and the RS flip-flop 568 can hold the inverted output signal SF at OFF. Accordingly, the pulse 510 in the AND circuit output signal SC and the light emission trigger pulse 515 in the light emission trigger signal SD that correspond to the detection pulse 502 may not be generated.

The timer 567 may output a pulse when Tmin has passed from the falling edge of the detection pulse 501. The reset input signal of the RS flip-flop 568 can change from OFF to ON. At this time, the set input signal of the RS flip-flop 568 can be OFF. The inverted output signal SF of the RS flip-flop 568 can change from OFF to ON, as indicated by a rising edge 707. Thereafter, the set input signal of the RS flip-flop 568 can change from ON to OFF when the detection pulse of the passage timing signal SA is inputted.

After the inverted output signal SF of the RS flip-flop 568 has changed from OFF to ON, the pulse 503 of the passage timing signal SA may be inputted. Because the inverted output signal SF of the RS flip-flop 568 is ON, the AND circuit 563 may generate the pulse 511 from the pulse 503 and output the generated pulse 511.

The delay circuit 564 may generate the light emission trigger pulse 516, which is delayed from the pulse 511 by the delay time td, based on the pulse 511 in the AND circuit output signal SC, and may output the generated light emission trigger pulse 516 to the laser apparatus 3.

In FIG. 9, a relationship among the pulses 504, 704, 512, and 517 and the operations performed by the light emission trigger signal generation unit 552 with respect to the generation of these pulses may be the same as with the pulses 503, 703, 511, and 516. Likewise, a relationship among the pulses 505, 705, 513, and 518 and the operations performed by the light emission trigger signal generation unit 552 with respect to the generation of these pulses may be the same as with the pulses 503, 703, 511, and 516.

Furthermore, a relationship among the pulses 506, 706, the pulse 514 that is not present, and the pulse 519 that is not present, and the operations performed by the light emission trigger signal generation unit 552 with respect to the generation of these pulses, may be the same as with the pulses 502, 702, the pulse 510 that is not present, and the pulse 515 that is not present.

Effect

According to the aforementioned configuration, the light emission trigger pulse can be suppressed from being outputted in the case where the time interval T of the detection pulses of the targets is less than the minimum permissible value Tmin. As a result, a drop in the pulse energy and a change in the pulsewidth of the pulse laser beam outputted from the laser apparatus 3 can be suppressed. This in turn makes it possible to suppress fluctuations in the pulse energy of the EUV light and suppress the laser apparatus 3 from being damaged.

In the aforementioned configuration, after the light emission trigger pulse corresponding to a detection pulse has been generated, the next light emission trigger pulse can be generated in response to the detection pulse that occurs immediately after Tmin, which is set in the timer, has passed following the first detection pulse. Accordingly, the time interval of the light emission trigger pulse can be suppressed from becoming too long.

5.2 Second Embodiment

A second embodiment will be described with reference to FIGS. 10 and 11. The following will focus primarily on differences from the first embodiment. In addition to the light emission trigger pulse outputted in response to the detection of a target including satellites, the laser controller 55 according to the second embodiment may generate a dummy light emission trigger pulse and output the dummy light emission trigger pulse to the laser apparatus 3. Through this, the stability of the pulse laser beam outputted from the laser apparatus 3 can be improved.

Configuration

Figure 10:
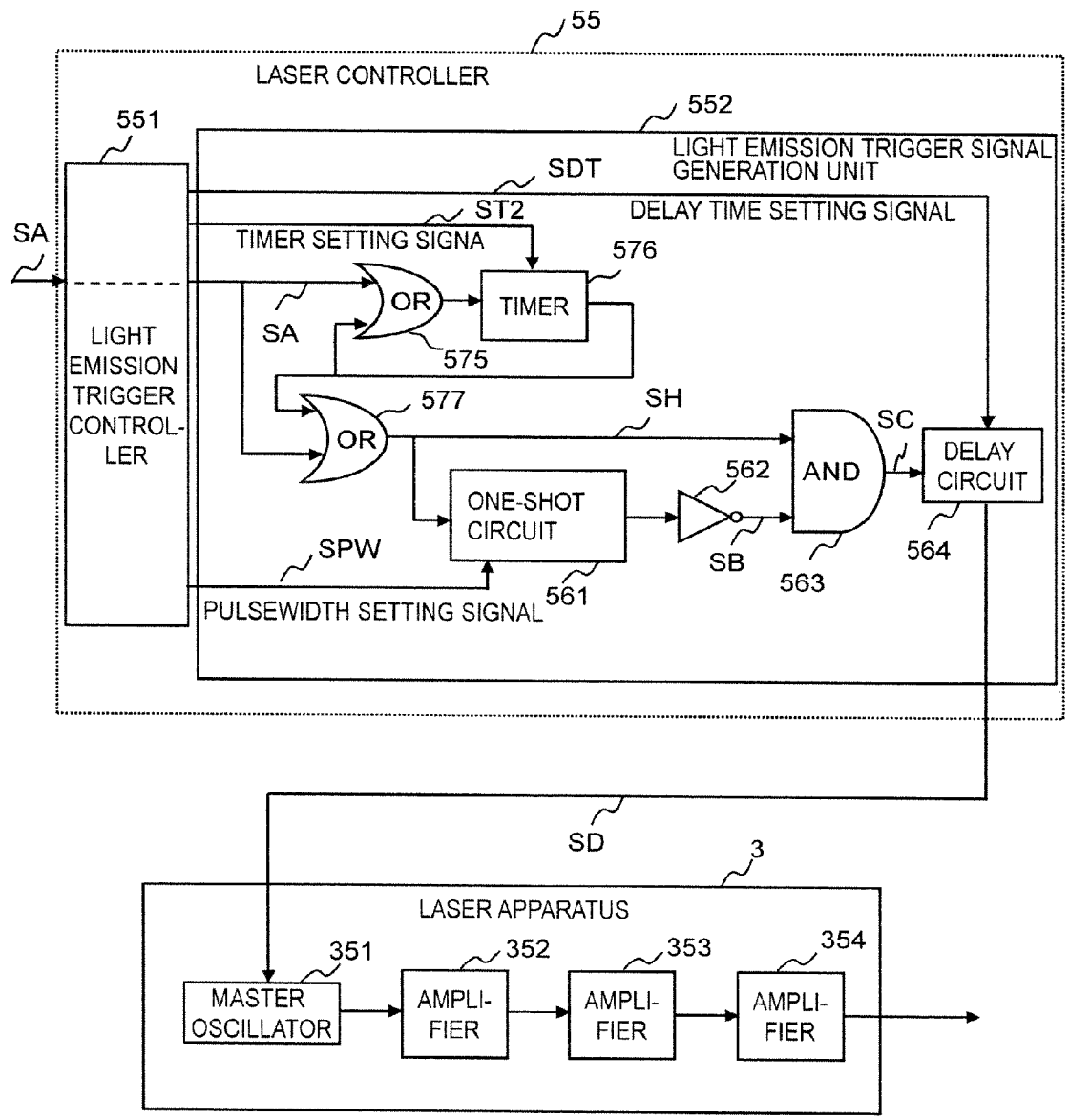
FIG. 10 schematically illustrates an example of the configuration of a laser controller and a laser apparatus according to a second embodiment.

FIG. 10 schematically illustrates an example of the configuration of the laser controller 55 and the laser apparatus 3 according to the second embodiment. In addition to the configuration shown in FIG. 6, the light emission trigger controller 551 may include OR circuits 575 and 577 and a timer 576.

The timer 576 may output a pulse when a set amount of time has passed following the detection of a measurement start trigger. The light emission trigger controller 551 may set a set time in the timer 576 using a timer setting signal ST2. The set time may be, for example, a maximum permissible time interval Tmax for the light emission trigger pulse outputted to the laser apparatus 3.

The timer 576 may start measuring time in response to the rising edge of an input signal serving as the measurement start trigger, for example. Upon detecting the measurement start trigger while measuring the time, the timer 576 may reset the measurement time and then start the time measurement again.

One input of the OR circuit 575 may be connected to an output of the light emission trigger controller 551, and another input of the OR circuit 575 may be connected to an output of the timer 576. The passage timing signal SA may be inputted to the OR circuit 575 from the light emission trigger controller 551. An input of the timer 576 may be connected to an output of the OR circuit 575.

One input of the OR circuit 577 may be connected to the output of the light emission trigger controller 551, and another input of the OR circuit 577 may be connected to the output of the timer 576. The passage timing signal SA may be inputted to the OR circuit 577 from the light emission trigger controller 551. An output of the OR circuit 577 may be connected to the input of the one-shot circuit 561 and an input of the AND circuit 563.

As shown in FIG. 10, a former-stage circuit configured of the OR circuits 575 and 577 and the timer 576 and a latter-stage circuit configured of the one-shot circuit 561, the inverter 562, and the AND circuit 563 may be connected in series.

Operation

Operations performed by the former-stage circuit configured of the OR circuits 575 and 577 and the timer 576 will be described here. Operations performed by the latter-stage circuit are as described in the first embodiment with reference to FIGS. 6 and 7. The former-stage circuit configured of the OR circuits 575 and 577 and the timer 576 may generate a dummy detection pulse and output the dummy detection pulse to the latter-stage circuit when the set time set in the timer 576 has passed from the previous detection pulse in the passage timing signal SA. Here, "dummy detection pulse" refers to a pulse generated without correspondence to the detection of a target including satellites.

Figure 11:
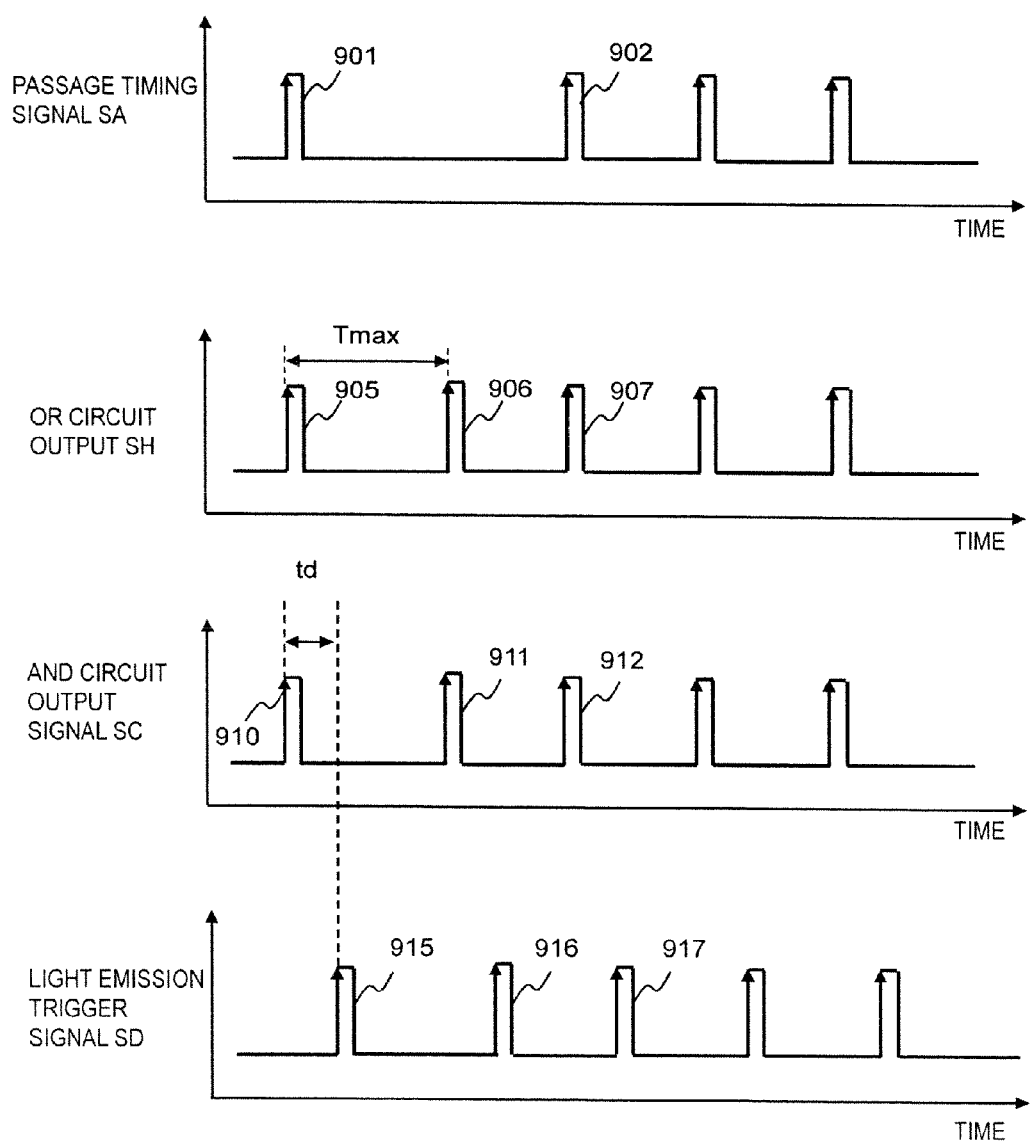
FIG. 11 illustrates an example of timing charts indicating signals from a light emission trigger signal generation unit according to the second embodiment.

FIG. 11 is an example of timing charts indicating signals in the light emission trigger signal generation unit 552. Specifically, FIG. 11 is an example of timing charts for the passage timing signal SA, an output signal SH from the OR circuit 577, the output signal SC from the AND circuit 563, and the light emission trigger signal SD.

When the detection pulse 901 of the passage timing signal is inputted, the OR circuit 577 may output a pulse 905 in the output signal SH. In the latter-stage circuit, the AND circuit 563 may output a pulse 910, corresponding to the pulse 905, in the output signal SC. The delay circuit 564 may output the light emission trigger pulse 915 in which the pulse 910 is delayed.

The timer 576 may receive the detection pulse 901 via the OR circuit 575. The timer 576 may start measuring the set time Tmax from the rising edge of the detection pulse 901. Upon receiving a new pulse during the time measurement, the timer 576 may reset the measurement time and then start the time measurement again.

In the case where a new detection pulse in the passage timing signal SA is not inputted by the time the timer 576 finishes measuring the time Tmax, the timer 576 may output a pulse when the time measurement ends. The pulse from the timer 576 can be the dummy detection pulse.

The OR circuit 577 may output a pulse 906 corresponding to the dummy detection pulse from the timer 576. In the latter-stage circuit, the AND circuit 563 may output a pulse 911, corresponding to the pulse 906, in the output signal SC. The delay circuit 564 may output a dummy light emission trigger pulse 916, in which the pulse 911 is delayed, as a dummy light emission trigger.

A relationship among the pulses 902, 907, 912, and 917 and the operations performed by the light emission trigger signal generation unit 552 with respect to the generation of these pulses may be the same as with the pulses 901, 905, 910, and 915.

Effect

As described in the first embodiment with reference to FIGS. 6 and 7, the one-shot circuit 561, the inverter 562, and the AND circuit 563 in the aforementioned configuration can forgo outputting light emission trigger pulses corresponding to some target detection pulses. Through this, the time interval of the light emission trigger pulses can be suppressed from dropping below the minimum permissible value.

On the other hand, the OR circuits 575 and 577 and the timer 576 in the aforementioned configuration can generate the dummy light emission trigger pulse when the predetermined amount of time has passed from the output of the previous light emission trigger pulse. Through this, the time interval of the light emission trigger pulses outputted to the laser apparatus 3 can be suppressed from exceeding the maximum permissible value. Thus, according to the configuration described in the present embodiment, the time interval T of the light emission trigger pulses can be held between the maximum permissible value and the minimum permissible value.

Note that in the aforementioned exemplary configuration, the latter-stage circuit that suppresses the time interval of the light emission trigger pulses from dropping below the minimum permissible value may be omitted. Even according to such a configuration, the time interval of the light emission trigger pulses can be held within a range that is no greater than the maximum permissible value. The latter-stage circuit may have the configuration illustrated in FIG. 8.

5.3 Third Embodiment

A third embodiment will be described with reference to FIGS. 12 and 13. The following will focus primarily on differences from the second embodiment. The EUV light generation system 11 according to the present embodiment may block a pulse laser beam outputted in accordance with the dummy light emission trigger pulse. Through this, an undesirable pulse laser beam resulting from the dummy light emission trigger pulse can be suppressed from irradiating the plasma generation region 25.

Configuration

Figure 12:
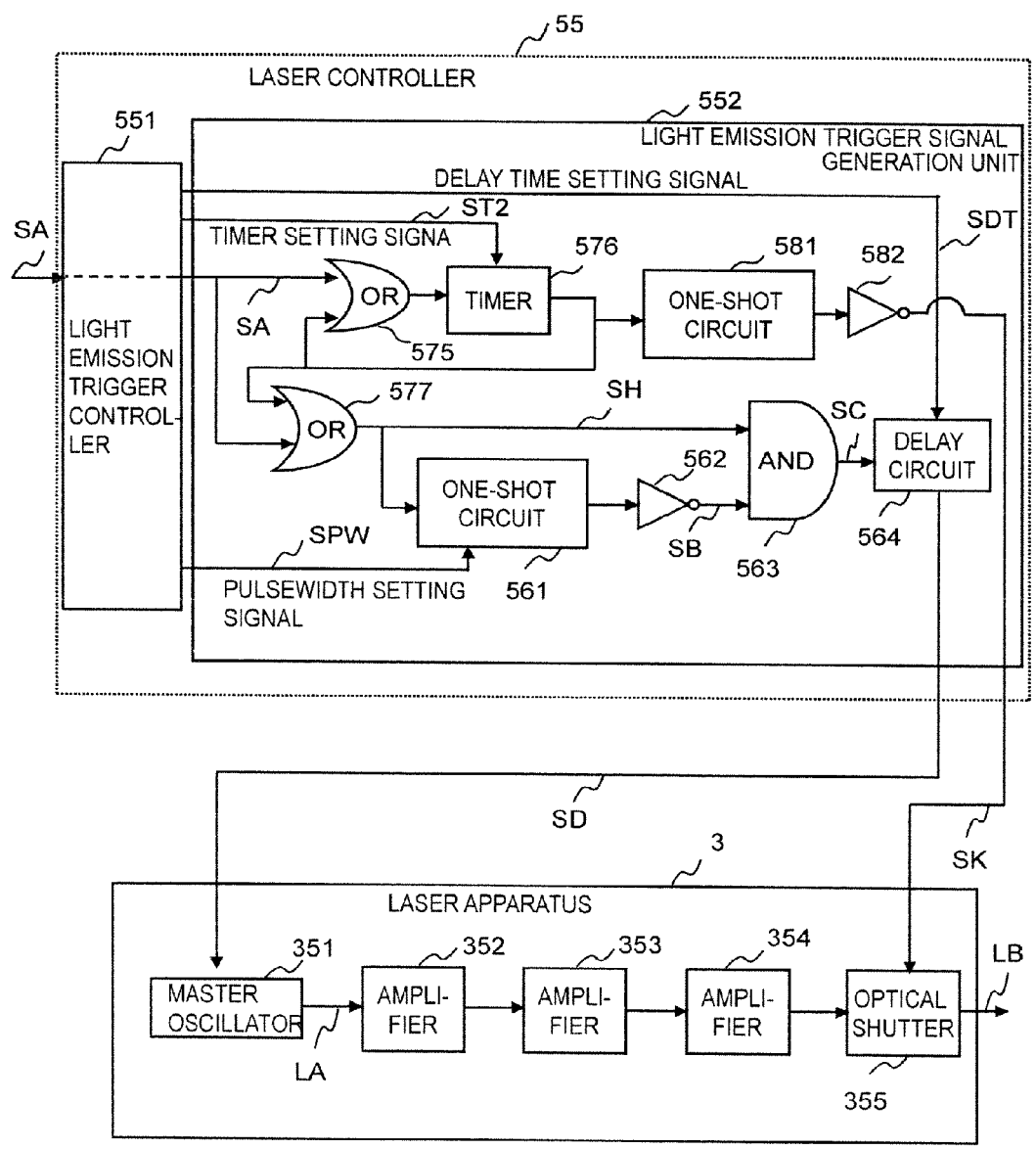
FIG. 12 schematically illustrates an example of the configuration of a laser controller and a laser apparatus according to a third embodiment.

FIG. 12 schematically illustrates an example of the configuration of the laser controller 55 and the laser apparatus 3 according to the third embodiment. In addition to the configuration shown in FIG. 10, the light emission trigger controller 551 may include a one-shot circuit 581 and an inverter 582. In addition to the configuration shown in FIG. 10, the laser apparatus 3 may include an optical shutter 355.

An input of the one-shot circuit 581 may be connected to the output of the timer 576. An output of the one-shot circuit 581 may be connected to an input of the inverter 582. An output of the inverter 582 may be connected to an input of the optical shutter 355.

Upon detecting the rising edge of an input signal, the one-shot circuit 581 may output a pulse having a pulsewidth Tsh2. The pulsewidth Tsh2 can indicate a time for which the pulse laser beam is to be blocked. The pulsewidth Tsh2 may have a length equivalent to greater than or equal to an amount of time from when the rising edge is inputted to the one-shot circuit 581 to when the output of a pulse laser beam from the amplifier 354 resulting from the dummy light emission trigger pulse stops.

A value of the pulsewidth Tsh2 may be set in the one-shot circuit 581 in advance. The light emission trigger controller 551 may set the value of the pulsewidth Tsh2 in the one-shot circuit 581.

The laser apparatus 3 may include the optical shutter 355, disposed in the optical path of the pulse laser beam generated by the master oscillator 351. The optical shutter 355 maybe disposed in, for example, the optical path of the pulse laser beam amplified by and outputted from the amplifier 354. Alternatively, the optical shutter 355 maybe disposed in the optical path of the pulse laser beam between the master oscillator 351 and the amplifier 352, between the amplifier 352 and the amplifier 353, or between the amplifier 353 and the amplifier 354.

The optical shutter 355 may block the pulse laser beam by absorbing or reflecting the pulse laser beam. For example, the optical shutter 355 may switch the optical path of the pulse laser beam between a first optical path and a second optical path (not shown) by switching between transmitting and reflecting the pulse laser beam.

The first optical path may be an optical path through which the pulse laser beam is focused at the plasma generation region 25. The second optical path may be an optical path through which the pulse laser beam passes outside the plasma generation region 25 and is absorbed in a laser damper (not shown). The optical shutter 355 may open and close the optical path to the plasma generation region 25 by switching the optical path of the pulse laser beam in this manner.

When the optical shutter 355 is open, the pulse laser beam can pass through the optical shutter 355 and advance along the first optical path to the plasma generation region 25. When the optical shutter 355 is closed, the pulse laser beam can be reflected by the optical shutter 355 and advance along the second optical path. The optical shutter 355 may be open when a control signal to the optical shutter 355 is ON, and may be closed when the control signal to the optical shutter 355 is OFF. The pulse laser beam can be blocked when the optical shutter 355 is closed.

The optical shutter 355 may have any configuration. For example, the optical shutter 355 may be configured including a Pockels cell and a polarizer. The Pockels cell can function as a λ/2 plate under an applied voltage. The optical shutter 355 may be configured including an acousto-optic device and a piezoelectric element. The acousto-optic device may diffract the pulse laser beam in accordance with applied vibrations.

Operation

As described in the second embodiment, the timer 576 may output a pulse in the case where the detection pulse interval T in the passage timing signal is greater than Tmax. The pulse can be the dummy detection pulse.

The one-shot circuit 581 may receive the dummy detection pulse from the timer 576. The one-shot circuit 581 may output a pulse having the pulsewidth Tsh2 in response to the rising edge of the dummy detection pulse. The inverter 582 may invert and output the signal from the one-shot circuit 581.

The inverter 582 may output, to the optical shutter 355, a pulse obtained by inverting the pulse from the one-shot circuit 581 in an optical shutter control signal SK. The inverted pulse inputted to the optical shutter 355 can have the pulsewidth Tsh2. The optical shutter 355 may be closed for the duration of the pulsewidth Tsh2 in which the inverted pulse is being received. The transmission of the pulse laser beam can be suppressed by the closed optical shutter 355.

The dummy light emission trigger based on the dummy detection pulse from the timer 576 can be inputted to the master oscillator 351. The master oscillator 351 can emit the pulse laser beam in response to the inputted dummy light emission trigger pulse. The pulse laser beam from the master oscillator 351 can be amplified by the amplifiers 352 to 354, and the amplified pulse laser beam can then be outputted from the amplifier 354. The optical shutter 355 can be closed in accordance with the optical shutter control signal SK from the inverter 582, and can suppress the amplified pulse laser beam from the amplifier 354 from passing.

On the other hand, in the case where the detection pulse interval T in the passage timing signal SA is less than or equal to Tmax, the optical shutter control signal SK can be ON, without the dummy detection pulse being outputted from the timer 576. In other words, the optical shutter 355 can be open, and the amplified pulse laser beam from the amplifier 354 can pass through the optical shutter 355.

Figure 13:
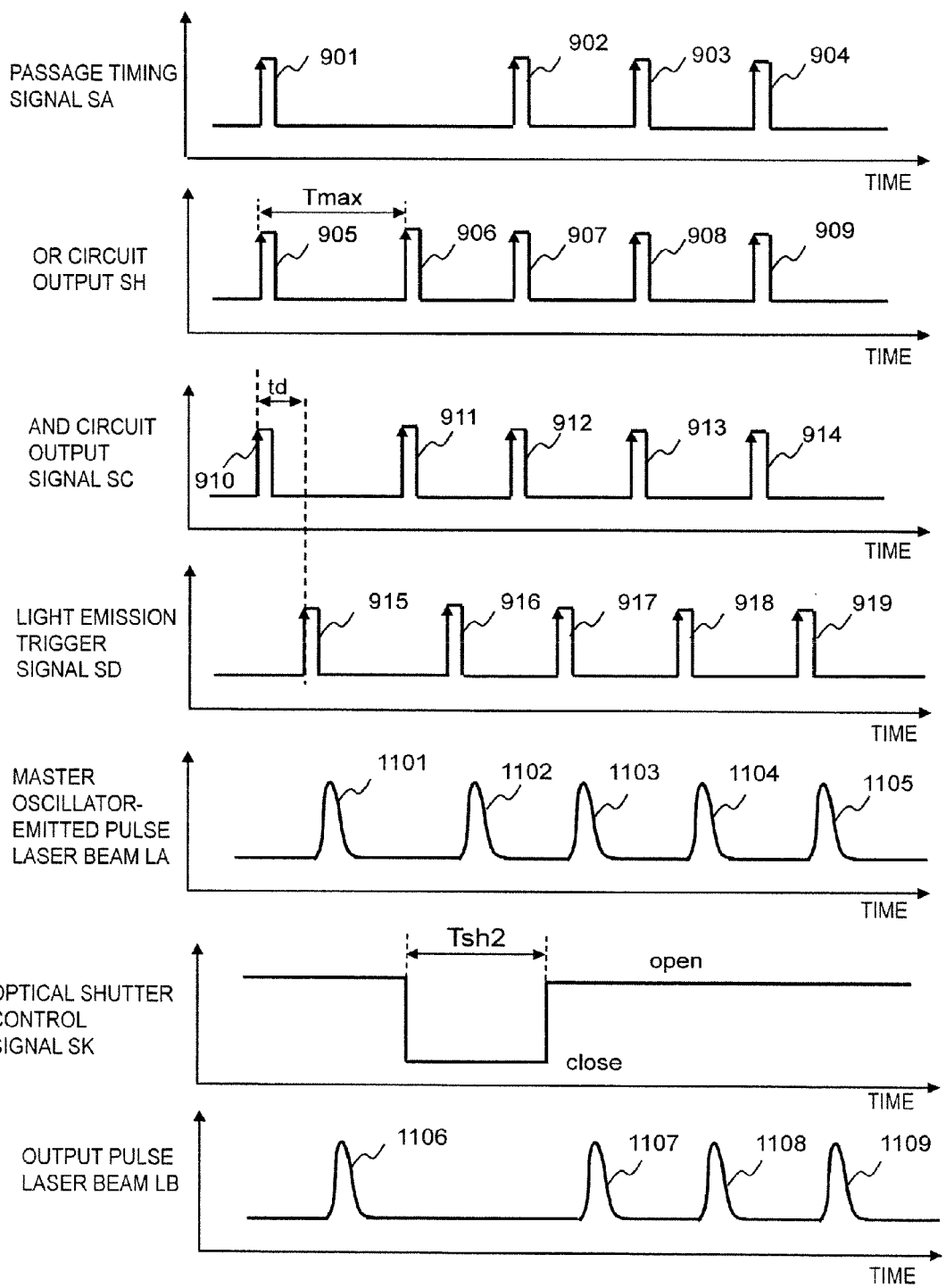
FIG. 13 illustrates an example of timing charts indicating signals from a light emission trigger signal generation unit and a pulse laser beam in a laser apparatus according to the third embodiment.

FIG. 13 is an example of timing charts indicating signals in the light emission trigger signal generation unit 552 and pulse laser beams in the laser apparatus 3. In addition to the timing charts indicated in FIG. 11, FIG. 13 indicates timing charts of a pulse laser beam LA outputted from the master oscillator 351, the control signal SK inputted to the optical shutter 355, and a pulse laser beam LB outputted from the laser apparatus 3 to the exposure apparatus 6.

In FIG. 13, the timing charts aside from the timing charts for the master oscillator-emitted pulse laser beam LA, the optical shutter control signal SK, and the output pulse laser beam LB are the same as the timing charts indicated in FIG. 11. The master oscillator 351 may output laser beam pulses 1101 to 1105 in response to the light emission trigger pulses 915 to 919, respectively.

The pulse 906 in the OR circuit output signal SH, the pulse 911 in the AND circuit output signal SC, the dummy light emission trigger pulse 916 in the light emission trigger signal SD, and the laser beam pulse 1102 in the master oscillator-emitted pulse laser beam LA can be generated in accordance with the dummy detection pulse from the timer 576.

The optical shutter control signal SK can change from ON to OFF in accordance with the dummy detection pulse from the timer 576. The time for which the optical shutter control signal SK is OFF can be equivalent to the pulsewidth Tsh2 of the one-shot circuit 581. The laser beam pulse 1102 in the master oscillator-emitted pulse laser beam LA can be outputted while the optical shutter control signal SK is OFF, and can thus be blocked by the optical shutter 355. Accordingly, the output laser beam pulse from the laser apparatus 3 resulting from the laser beam pulse 1102 from the master oscillator 351 can be suppressed.

Effect

According to the configuration described in the present embodiment, in the case where the detection pulse interval T in the passage timing signal SA is greater than Tmax, the master oscillator 351 can emit the pulse laser beam due to the dummy light emission trigger pulse. As a result, fluctuations in the pulse laser beam from the master oscillator 351 can be suppressed.

Furthermore, the pulse laser beam outputted from the master oscillator 351 in response to the dummy light emission trigger pulse can be blocked by the optical shutter. As a result, the pulse laser beam can be suppressed from irradiating the plasma generation region 25 in response to the dummy light emission trigger pulse. Through this, an increase in debris caused by the pulse laser beam outputted in response to the dummy light emission trigger pulse can be suppressed. In the case where gas present in the chamber 2, satellites of targets that have not been detected, and so on are present in the plasma generation region 25, these items can produce plasma when irradiated with the pulse laser beam, which in turn can produce debris. The debris may be fast ions scattered from the plasma, scattered particles such as neutral particles, or the like, and can spatter on or adhere to optical components such as the EUV collector mirror 23, causing a drop in the optical performance thereof.

5.4 Fourth Embodiment

A fourth embodiment will be described with reference to FIG. 14. The following will focus primarily on differences from the third embodiment. The laser apparatus 3 according to the present embodiment may include a pre-pulse laser device in addition to a main laser device.

The EUV light generation system 11 according to the present embodiment may block a main pulse laser beam outputted from the main laser device in response to the dummy light emission trigger pulse as well as a pre-pulse laser beam outputted from the pre-pulse laser device in response to the dummy light emission trigger pulse. Through this, an undesirable pulse laser beam resulting from the dummy light emission trigger pulse can be suppressed from irradiating the plasma generation region 25.

Configuration

Figure 14:
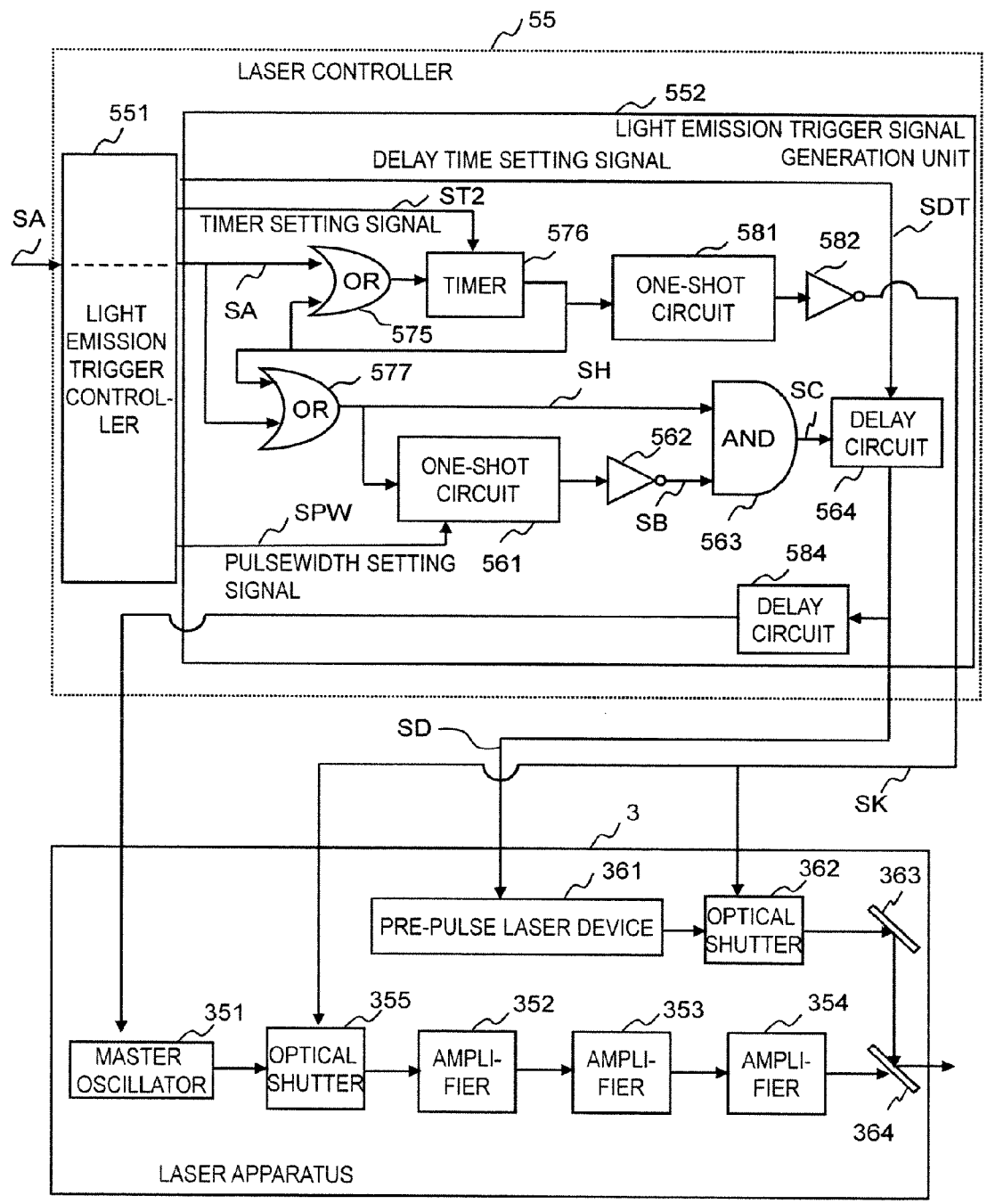
FIG. 14 schematically illustrates an example of the configuration of a laser controller and a laser apparatus according to a fourth embodiment.

FIG. 14 schematically illustrates an example of the configuration of the laser controller 55 and the laser apparatus 3 according to the fourth embodiment. In addition to the configuration shown in FIG. 12, the laser apparatus 3 may include a pre-pulse laser device 361, an optical shutter 362, a high-reflecting mirror 363, and a dichroic mirror 364. The pre-pulse laser device 361 may be a solid-state laser device such as a YAG laser device.

In the present embodiment, the master oscillator 351 may be referred to as a main pulse laser device. An apparatus configured by and including the master oscillator 351, the amplifiers 352, 353, and 354, and the optical shutter 355 will be referred to as a main pulse laser apparatus. A laser beam emitted from the master oscillator 351 and a beam obtained by amplifying that laser beam may be referred to as the main pulse laser beam.

Referring to FIG. 14, the optical shutter 355 may be disposed in an optical path between the master oscillator 351 and the amplifier 352. The dichroic mirror 364 may be disposed in the optical path of the main pulse laser beam. The main pulse laser beam may be incident on the dichroic mirror 364. The dichroic mirror 364 may allow the main pulse laser beam to pass through, at a high level of transmissibility, toward an optical path of the exposure apparatus 6.

The pre-pulse laser device 361 may output the pre-pulse laser beam. The pre-pulse laser beam may contain a different wavelength component from a wavelength component contained in the main pulse laser beam. The optical shutter 362 may be disposed in an optical path of the pre-pulse laser beam. Like the optical shutter 355, the optical shutter 362 may block the pre-pulse laser beam by switching the optical path of the pre-pulse laser beam in accordance with the optical shutter control signal SK.

The high-reflecting mirror 363 may be disposed in the optical path of the pre-pulse laser beam. The high-reflecting mirror 363 may reflect the pre-pulse laser beam at a high level of reflectance. The pre-pulse laser beam reflected by the high-reflecting mirror 363 may be incident on the dichroic mirror 364. The dichroic mirror 364 may reflect the pre-pulse laser beam, at a high level of reflectance, toward the optical path of the exposure apparatus 6. The main pulse laser beam and the pre-pulse laser beam can both be conducted to the plasma generation region 25 as a result. The dichroic mirror 364 may be disposed so that the optical paths of the pre-pulse laser beam and the main pulse laser beam substantially match.

In addition to the configuration shown in FIG. 12, the light emission trigger controller 551 may include a delay circuit 584. An input of the delay circuit 584 may be connected to the output of the delay circuit 564. An output signal from the delay circuit 584 may be inputted to the master oscillator 351.

The output signal from the delay circuit 564 may be inputted to the pre-pulse laser device 361. A delay time of the delay circuit 584 can be equivalent to the time of a delay between the input of the light emission trigger to the pre-pulse laser device 361 and the input of the light emission trigger to the main pulse laser device. The light emission trigger controller 551 may set a predetermined delay time in the delay circuit 584.

An output of the inverter 582 may be connected to inputs of both the optical shutters 355 and 362. The same optical shutter control signal SK may be inputted to both the optical shutters 355 and 362. The optical shutter control signal inputted to the optical shutter 355 may be delayed from the optical shutter control signal inputted to the optical shutter 362 by the predetermined delay time.

Operation

As described in the second embodiment, the timer 576 may output a pulse in the case where the detection pulse interval T in the passage timing signal is greater than Tmax. The pulse can be the dummy detection pulse.

The one-shot circuit 581 may receive the dummy detection pulse from the timer 576. The one-shot circuit 581 may output a pulse having the pulsewidth Tsh2 in response to the rising edge of the dummy detection pulse. The inverter 582 may invert and output the signal from the one-shot circuit 581.

The inverter 582 may output, to the optical shutters 362 and 355, a pulse obtained by inverting the pulse from the one-shot circuit 581 in the optical shutter control signal SK. The inverted pulse inputted to the optical shutters 362 and 355 can have the pulsewidth Tsh2.

The optical shutters 362 and 355 may be closed for the duration of the pulsewidth Tsh2 in which the inverted pulse is being received. The transmission of the main pulse laser beam and the pre-pulse laser beam can be suppressed by the closed optical shutters 362 and 355. In other words, the main pulse laser beam and the pre-pulse laser beam can be blocked.

The dummy light emission trigger pulse corresponding to the dummy detection pulse from the timer 576 can be inputted to the pre-pulse laser device 361 and the master oscillator 351. The dummy light emission trigger pulse inputted to the master oscillator 351 may be delayed, by the delay circuit 584, from the dummy light emission trigger pulse inputted to the pre-pulse laser device 361.

The pre-pulse laser device 361 can emit the pre-pulse laser beam in response to the inputted dummy light emission trigger pulse. The optical shutter 362 can be closed in accordance with the optical shutter control signal SK from the inverter 582, and can suppress the pre-pulse laser beam from the pre-pulse laser device 361 from passing.

The master oscillator 351 can emit the main pulse laser beam in response to the inputted dummy light emission trigger pulse. The optical shutter 355 can be closed in accordance with the optical shutter control signal SK from the inverter 582, and can suppress the main pulse laser beam from the master oscillator 351 from passing.

On the other hand, in the case where the detection pulse interval T in the passage timing signal SA is less than or equal to Tmax, the optical shutter control signal SK of the optical shutters 362 and 355 can be ON, without the dummy detection pulse being outputted from the timer 576. In other words, the optical shutters 362 and 355 can be open, and the pulse laser beams from the pre-pulse laser device 361 and the master oscillator 351 can pass through the optical shutters 362 and 355, respectively.

Effect

According to the configuration described in the present embodiment, in the case where the detection pulse interval T in the passage timing signal SA is greater than Tmax, the master oscillator 351 and the pre-pulse laser device 361 can emit the pulse laser beams in response to the dummy light emission trigger pulse. Through this, fluctuations in the pulse laser beams from the master oscillator 351 and the pre-pulse laser device 361 can be suppressed.

Furthermore, the pulse laser beams outputted from the master oscillator 351 and the pre-pulse laser device 361 in response to the dummy light emission trigger pulse can be blocked by the respective optical shutters. As a result, the pulse laser beam can be suppressed from irradiating the plasma generation region 25 in response to the dummy light emission trigger pulse. Through this, an increase in debris caused by the pulse laser beam outputted in response to the dummy light emission trigger pulse can be suppressed.

The above-described embodiments and the modifications thereof are merely examples for implementing the present disclosure, and the present disclosure is not limited thereto. Making various modifications according to the specifications or the like is within the scope of the present disclosure, and other various embodiments are possible within the scope of the present disclosure. For example, the modifications illustrated for particular ones of the embodiments can be applied to other embodiments as well (including the other embodiments described herein).

The configurations of the constituent elements illustrated in the drawings and described in the aforementioned embodiments are merely examples, and the constituent elements may have other configurations instead. The aforementioned constituent elements, functions, and so on may be partially or entirely realized through hardware, by appropriate electrical circuit design or the like. Likewise, the aforementioned constituent elements, functions, and so on may be realized through software, by a processor analyzing and executing programs that realize those respective functions.

The configuration of a given embodiment can be partially replaced with the configuration of another embodiment. The configuration of a given embodiment can be added to the configuration of another embodiment. Parts of the configurations of the respective embodiments can be removed or replaced with other configurations, and other configurations can be added thereto.

The terms used in this specification and the appended claims should be interpreted as "non-limiting." For example, the terms "include" and "be included" should be interpreted as "including the stated elements but not limited to the stated elements." The term "have" should be interpreted as "having the stated elements but not limited to the stated elements." Further, the modifier "one (a/an)" should be interpreted as "at least one" or "one or more."

What is claimed is:

1. An extreme ultraviolet light generation apparatus that generates extreme ultraviolet light by irradiating a target with a pulse laser beam and producing plasma, the apparatus comprising,
    a chamber containing a plasma generation region irradiated by a pulse laser beam from a laser apparatus;
    a target supply device configured to supply a plurality of targets consecutively to the plasma generation region in the chamber;
    a target detection unit configured to detect a target outputted from the target supply device that has passed a predetermined position between the target supply device and the plasma generation region; and
    laser control circuitry configured to control the laser apparatus,
    the laser control circuitry including a light emission trigger generation circuit configured to generate a light emission trigger instructing a laser device included in the laser apparatus to emit a pulse laser beam, and output the generated light emission trigger to the laser apparatus,
    the light emission trigger generation circuit including a first circuit configured to output a first signal that changes from OFF to ON after a first time has passed from a detection signal indicating target detection from the target detection unit, and a first AND circuit configured to output an AND signal of the first signal and the detection signal,
    the light emission trigger generation circuit outputting the light emission trigger to the laser apparatus based on an output from the first AND circuit, and
    the laser control circuitry outputting the light emission trigger to the laser apparatus in response to a next detection signal received immediately after the first time has passed following the detection signal.

2. The extreme ultraviolet light generation apparatus according to claim 1, wherein the first circuit includes a falling detection circuit configured to detect falling of the detection signal from the target detection unit.

3. The extreme ultraviolet light generation apparatus according to claim 1, wherein the emission trigger generation circuit includes a delay circuit configured to generate the light emission trigger based on the AND signal from the first AND circuit.

4. The extreme ultraviolet light generation apparatus according to claim 1, wherein the laser control circuitry includes a light emission trigger control circuit configured to transfer the detection signal from the target detection unit to the first AND circuit.

5. An extreme ultraviolet light generation apparatus that generates extreme ultraviolet light by irradiating a target with a pulse laser beam and producing plasma, the apparatus comprising,
    a chamber containing a plasma generation region irradiated by a pulse laser beam from a laser apparatus;
    a target supply device configured to supply a plurality of targets consecutively to the plasma generation region in the chamber;
    a target detection unit configured to detect a target outputted from the target supply device that has passed a predetermined position between the target supply device and the plasma generation region; and
    laser control circuitry configured to control the laser apparatus,
    the laser control circuitry including a light emission trigger generation circuit configured to generate a light emission trigger instructing a laser device included in the laser apparatus to emit a pulse laser beam, and output the generated light emission trigger to the laser apparatus,
    the light emission trigger generation circuit including a first circuit configured to output a first signal that changes from OFF to ON after a first time has passed from a detection signal indicating target detection from the target detection unit, and a first AND circuit configured to output an AND signal of the first signal and the detection signal,
    the light emission trigger generation circuit outputting the light emission trigger to the laser apparatus based on an output from the first AND circuit, and
    the first circuit including a one-shot circuit configured to output a pulse of a predetermined pulse width in accordance with a detection signal from the target detection unit and an inverter configured to invert output from the one-shot circuit and output the inverted output to the first AND circuit.

6. An extreme ultraviolet light generation apparatus that generates extreme ultraviolet light by irradiating a target with a pulse laser beam and producing plasma, the apparatus comprising, a chamber containing a plasma generation region irradiated by a pulse laser beam from a laser apparatus;

a target supply device configured to supply a plurality of targets consecutively to the plasma generation region in the chamber;

a target detection unit configured to detect a target outputted from the target supply device that has passed a predetermined position between the target supply device and the plasma generation region; and laser control circuitry configured to control the laser apparatus, the laser control circuitry including a light emission trigger generation circuit configured to generate a light emission trigger instructing a laser device included in the laser apparatus to emit a pulse laser beam, and output the generated light emission trigger to the laser apparatus, the light emission trigger generation circuit including a first circuit configured to output a first signal that changes from OFF to ON after a first time has passed from a detection signal indicating target detection from the target detection unit, and a first AND circuit configured to output an AND signal of the first signal and the detection signal, the light emission trigger generation circuit outputting the light emission trigger to the laser apparatus based on an output from the first AND circuit, and the first circuit including a timer to measure the first time and a second circuit configured to output an OFF signal to the first AND circuit while the timer measures the first time and an ON signal to the first AND circuit after the timer measures the first time.

7. The extreme ultraviolet light generation apparatus according to claim 6, wherein the first circuit includes a falling detection circuit configured to detect falling of the detection signal from the target detection unit.

8. The extreme ultraviolet light generation apparatus according to claim 7, wherein the first circuit includes a second AND circuit configured to output an AND signal to the timer based on the detection signal.

9. The extreme ultraviolet light generation apparatus according to claim 8, wherein the second circuit is a flip-flop circuit.

10. The extreme ultraviolet light generation apparatus according to claim 9, wherein the timer is configured to output the ON signal to the second circuit to invert output of the second circuit after the timer measures the first time.

11. The extreme ultraviolet light generation apparatus according to claim 10, wherein the timer is configured to reset measurement of the first time upon detecting a next detection signal while the timer measures the first time.

12. The extreme ultraviolet light generation apparatus according to claim 10, wherein the emission trigger generation circuit includes a delay circuit configured to generate the light emission trigger based on the AND signal from the first AND circuit.

13. The extreme ultraviolet light generation apparatus according to claim 10, wherein the laser control circuitry includes a light emission trigger control circuit configured to transfer the detection signal from the target detection unit to the first AND circuit and output a time setting signal for setting the timer.

14. The extreme ultraviolet light generation apparatus according to claim 10, wherein the falling detection circuit is configured to detect an edge of the detection signal.

15. The extreme ultraviolet light generation apparatus according to claim 7, wherein the second circuit is a flip-flop circuit.

16. The extreme ultraviolet light generation apparatus according to claim 7, wherein the timer is configured to output a signal for inverting output from the second circuit to the second circuit after the timer measures the first time.

17. The extreme ultraviolet light generation apparatus according to claim 7, wherein the timer is configured to output the ON signal to the second circuit to invert output of the second circuit after the timer measures the first time.

18. The extreme ultraviolet light generation apparatus according to claim 6, wherein the emission trigger generation circuit includes a delay circuit configured to generate the light emission trigger based on the AND signal from the first AND circuit.

19. The extreme ultraviolet light generation apparatus according to claim 6, wherein the laser control circuitry includes a light emission trigger control circuit configured to transfer the detection signal from the target detection unit to the first AND circuit and output a time setting signal for setting the timer.

* * * * *